(12) United States Patent
Weng et al.

(10) Patent No.: US 8,098,443 B2
(45) Date of Patent: Jan. 17, 2012

(54) MINIATURE ZOOM LENS SYSTEM

(75) Inventors: Chih-Wei Weng, Taipei County (TW);
Shu-Shan Chen, Changhua County
(TW); Chao-Chang Hu, Tainan (TW);
Chen-Er Hsu, Taoyuan County (TW)

(73) Assignee: TDK Taiwan Corp. (TW)

( * ) Notice: Subject to any disclaimer, the term of this patent is extended or adjusted under 35 U.S.C. 154(b) by 220 days.

(21) Appl. No.: 12/653,350

(22) Filed: Dec. 11, 2009

(65) Prior Publication Data
US 2011/0141579 A1    Jun. 16, 2011

(51) Int. Cl.
*G02B 15/14* (2006.01)
(52) U.S. Cl. ........................................ 359/689
(58) Field of Classification Search .................. 359/689, 359/740, 784
See application file for complete search history.

(56) References Cited

U.S. PATENT DOCUMENTS 7,019,912 B2 *   3/2006   Saori .............................. 359/682

* cited by examiner

*Primary Examiner* — Joseph P Martinez

(57) ABSTRACT

A miniature zoom lens system comprises three lens groups having four lenses in total. The first lens group has negative power and is fixed. The second lens group has positive power and includes two lenses. An aperture is furnished in front of and movable with the second lens group. The third lens group has positive power. The second and third lens groups are movable along an optical axis between a wide-angle position and a telephoto position. The system fulfills the following conditions: 11.5<Dw1-2/Dw2-3<18.5; and Dt1-2/Dt2-3<0.2. Wherein, Dw1-2 and Dt1-2 respectively are the air spacing between the first and second lens groups at the wide-angle position and the telephoto position; Dw2-3 and Dt2-3 respectively are the air spacing between the second and third lens groups at the wide-angle position and the telephoto position.

20 Claims, 22 Drawing Sheets

MINIATURE ZOOM LENS SYSTEM

BACKGROUND OF INVENTION

1. Field of the Invention

The present invention relates to miniature zoom lens systems and, more particularly, to a miniature zoom lens system which is applicable to the image capture module of a handheld communication device and which uses only three lens groups, which consist of four lenses in total, to provide a high zoom ratio while still having a small volume and good optical quality.

2. Description of the Prior Art

Recently, picture-taking and video recording functions have gradually become indispensable features of handheld communication devices such as cell phones, personal digital assistants, and notebook computers. As the image capture module of a handheld communication device must be compact and energy-saving, it is imperative to miniaturize the optical lens systems of such image capture modules and ensure that the lens systems deliver good optical performance.

In a miniature optical lens system having a focusing or zooming function, it is typically required that at least two lens groups and an electromagnetic driving device for driving the lens groups be arranged in a tiny space not larger than 15 $mm^3$. As a result, the number, size, and weight of the lenses used are all minimized. Presently, optical lens systems with a three-lens-group four-lens structure have been developed, as disclosed by U.S. Pat. No. 7,019,912 and U.S. Pat. No. 7,312,930. However, the known miniature optical lens systems still have bottlenecks and blind spots in design. More specifically, existing miniature optical lens systems either achieve compactness at the expense of zoom ratio or optical quality or vice versa. In U.S. Pat. No. 7,019,912, for example, the zoom ratio reaches no higher than approximately 2×, which does not meet consumers' general expectation of a zoom lens system. In U.S. Pat. No. 7,312,930, although the zoom ratio approaches 3×, the overall length of the lens system comes to 15.86 mm in an embodiment with a zoom ratio of 2.48×, and 17.91 mm in an embodiment with a zoom ratio of 2.93×. The excessively great overall length of the lens system directly increases the overall volume of the lens system and therefore needs to be reduced. In addition, the lens systems of the afore-cited patents also leave room for improvement in terms of optical quality.

SUMMARY OF INVENTION

The primary objective of the present invention is to provide a miniature zoom lens system which has a three-lens-group four-lens structure, provides a zoom ratio of about 3×, has a small overall length, and is improved in optical quality.

In order to achieve the aforementioned objective, the present invention discloses a miniature zoom lens system which comprises three lens groups that have four lenses in total. The first lens group has negative refractive power and is fixed. The second lens group has positive refractive power and includes two lenses. An aperture stop is furnished on the second lens group at a location facing the first lens group and is movable together with the second lens group. The third lens group has positive refractive power. The second and third lens groups are movable along an optical axis between a wide-angle position and a telephoto position. Wherein, the miniature zoom lens system fulfills the following conditions: 11.5<Dw1-2/Dw2-3<18.5; and, Dt1-2/Dt2-3<0.2.

Where:

Dw1-2 is an air spacing between the first lens group and the second lens group when the second lens group and the third lens group are in the wide-angle position;

Dw2-3 is an air spacing between the second lens group and the third lens group when the second lens group and the third lens group are in the wide-angle position;

Dt1-2 is an air spacing between the first lens group and the second lens group when the second lens group and the third lens group are in the telephoto position; and Dt2-3 is an air spacing between the second lens group and the third lens group when the second lens group and the third lens group are in the telephoto position.

In a preferred embodiment, the first lens group comprises a single first lens, the second lens group comprises a second lens and a third lens, the third lens group comprises a single fourth lens. Wherein, the miniature zoom lens system further satisfies condition of:

$$2.8 \leq ft/fw \leq 3.2;$$

where: fw is the effective focal length of the miniature zoom lens system when the second lens group and the third lens group are in the wide-angle position; and ft is the effective focal length of the miniature zoom lens system when the second lens group and the third lens group are in the telephoto position.

In a preferred embodiment, the miniature zoom lens system further satisfies condition of: 1.25<[(Dw1-2)−(Dt1-2)]/fw<1.95.

In a preferred embodiment, the miniature zoom lens system further satisfies conditions of:

$$0.32 < SQRT(fG2*fG3)/Dw < 0.50;$$

$$1.25 < (fw\_a)/(fg2\_a*fg3\_a) < 2.15;$$

$$0.12 < abs(BFL\_w - BFL\_t)/fw < 0.35; \text{ and}$$

$$6.5 < [(Dw1-2)-(Dt1-2)]/[(BFL\_w)-(BFL\_t)] < 10;$$

where:

fG2 is the effective focal length of the second lens group;

fG3 is the effective focal length of the third lens group;

Dw is a total optical length of the miniature zoom lens system when the second lens group and the third lens group are in the wide-angle position;

SQRT means taking square root;

fg2 is the effective focal length of the second lens;

fg3 is the effective focal length of the third lens;

$$fg2\_a = 1/abs(fg2);$$

$$fg3\_a = 1/abs(fg3);$$

$$fw\_a = 1/abs(fw);$$

BFL_w is the back focal length of the miniature zoom lens system when the second lens group and the third lens group are in the wide-angle position;

BFL_t is the back focal length of the miniature zoom lens system when the second lens group and the third lens group are in the telephoto position; and abs means taking absolute value.

BRIEF DESCRIPTION OF THE DRAWINGS

The structure and technical means adopted by the present invention to achieve the above and other objectives can be best understood by referring to the following detailed description of the preferred embodiments and the accompanying drawings, in which.

DETAILED DESCRIPTION OF PREFERRED EMBODIMENTS

The present invention provides a miniature zoom lens system that is suitable for use with an electromagnetic driving device, such as a voice coil motor (VCM), and an image sensor chip, such as a charge-coupled device (CCD) or a complementary metal-oxide-semiconductor (CMOS) device, thereby jointly forming an image capture module. The miniature zoom lens system of the present invention is particularly suitable for use in a handheld communication device that features compactness and demands energy-saving solutions, such as but not limited to cell phones, personal digital assistants, and notebook computers, so as to provide a picture-taking or video recording function.

Figure 1:
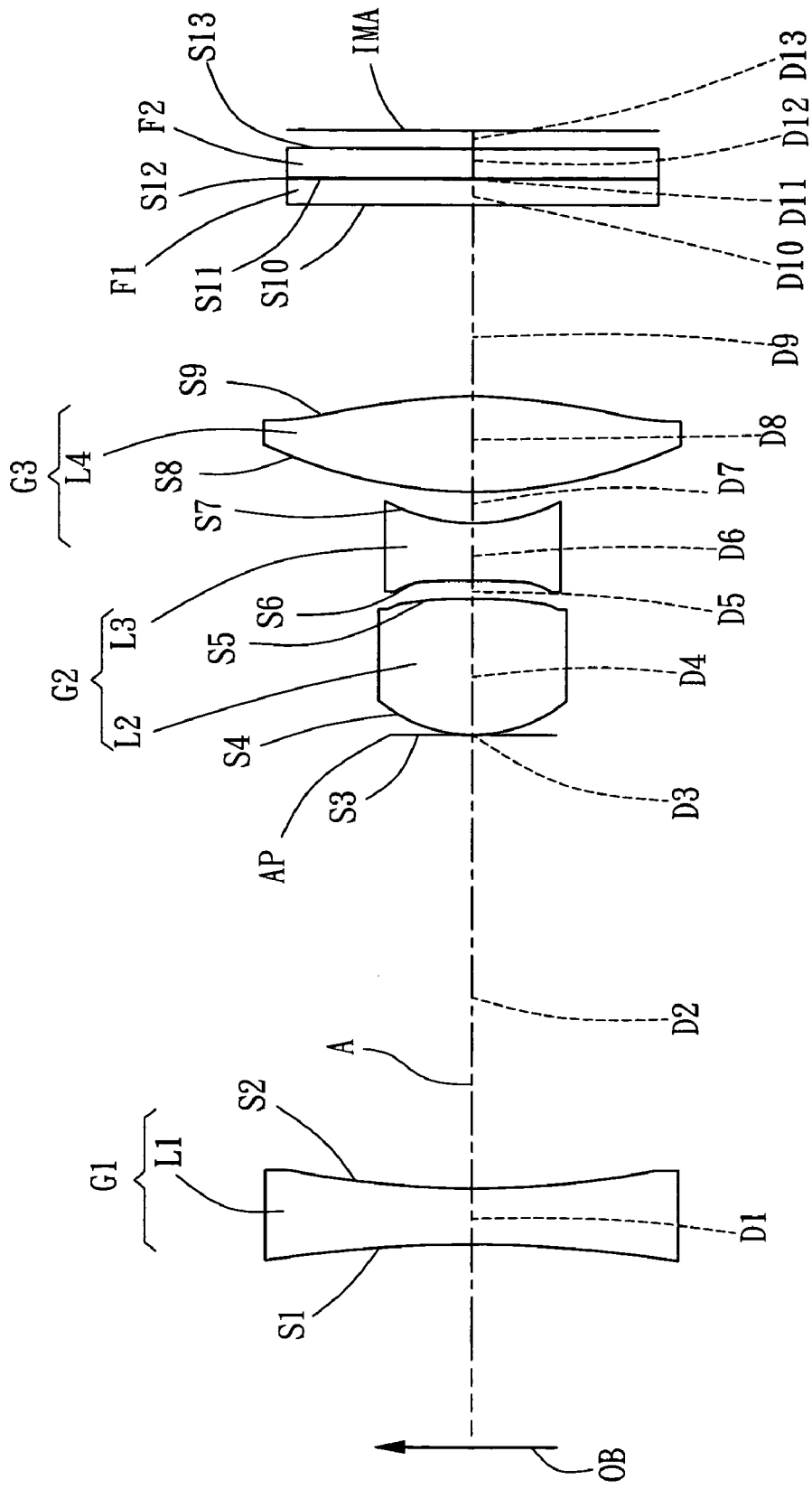
FIG. 1 is a side view of the structure and optical path of a miniature zoom lens system according to a first preferred embodiment of the present invention, wherein the miniature zoom lens system is in a wide-angle position.
Figure 3:
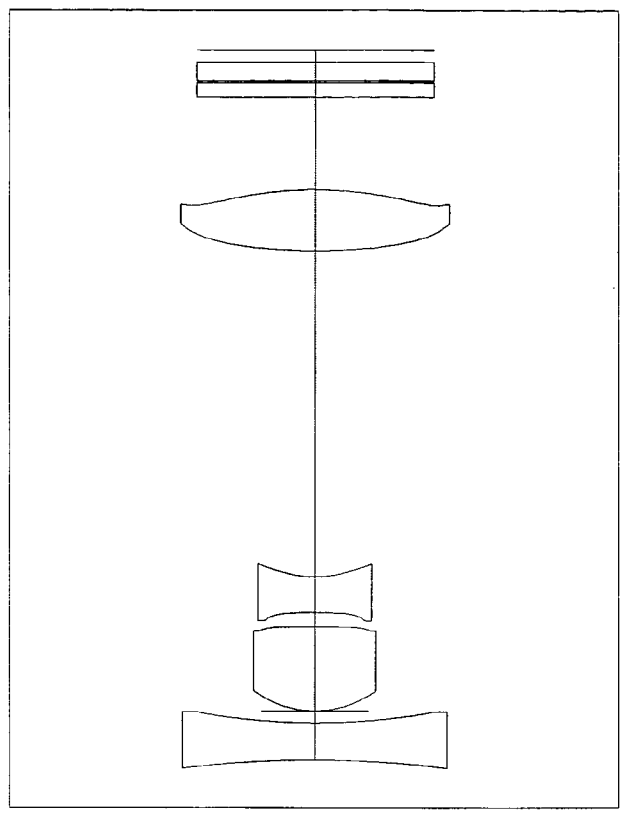
FIG. 3 is a side view of the structure and optical path of the miniature zoom lens system according to the first preferred embodiment of the present invention, wherein the miniature zoom lens system is in a telephoto position.
Figure 2:
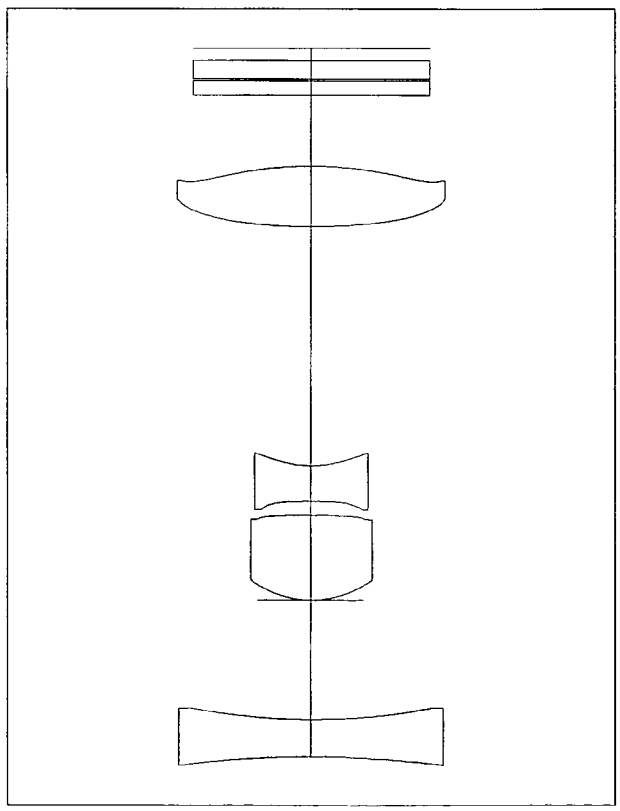
FIG. 2 is a side view of the structure and optical path of the miniature zoom lens system according to the first preferred embodiment of the present invention, wherein the miniature zoom lens system is in a middle position.

Please refer to FIG. 1, FIG. 2, and FIG. 3 for side views of the structure and optical path of a miniature zoom lens system according to a first preferred embodiment of the present invention, wherein the miniature zoom lens system is in a wide-angle position, a middle position, and a telephoto position, respectively. The miniature zoom lens system according to the present invention includes, arranged sequentially along an optical axis A from an object side OB at the leftmost end of the drawings to an imaging plane IMA at the rightmost end of the drawings: a first lens group G1, an aperture stop AP, a second lens group G2, a third lens group G3, a filter F1, and a transparent cover plate F2. The first lens group G1 is fixed in position whereas the second lens group G2 and the third lens group G3 are relatively movable along the optical axis A at least among the wide-angle position, the middle position, and the telephoto position when driven by an electromagnetic driving device (not shown), so as to provide a wide-angle focusing function, an intermediate-zoom ratio focusing function, and a telephoto focusing (magnification) function, respectively. It should be noted that the middle position depicted in FIG. 2 is not a fixed middle position but a zoom position that can be located anywhere between the wide-angle position and the telephoto position and have an arbitrary zoom ratio between 1× and 3×.

In the present invention, the first lens group G1 has a negative refractive power and only includes a single first lens L1. The aperture stop AP, which is disposed on a side of the second lens group G2 that faces the first lens group G1, moves with the second lens group G2. The second lens group G2 has a positive refractive power and includes two lenses, namely a second lens L2 and a third lens L3. The third lens group G3 has a positive refractive power and only includes a single fourth lens L4. The filter F1 is an infrared (IR)-cut filter or an optical filter having other functions. The transparent cover plate F2 is a glass cover for preventing particles or dust from attaching to the imaging plane IMA. The imaging plane IMA is an active side of an image sensor chip and is configured for receiving optical signals.

In the first embodiment of the present invention, the first lens L1 is a biconcave glass lens having a negative refractive power and further having, in order from the object side OB toward the right (equally applicable to similar descriptions that follow), a first surface S1 and a second surface S2. The first lens L1 has a thickness D1 along the optical axis A between the two surfaces S1, S2. The air spacing between the second surface S2 of the first lens L1 and the aperture stop AP is D2. The aperture stop AP has a third surface S3. The second lens L2 is a biconvex glass lens having a positive refractive power and further having, in order toward the right, a fourth surface S4 and a fifth surface S5. The air spacing between the aperture stop AP and the fourth surface S4 is D3. The second lens L2 has a thickness D4 along the optical axis A between the two surfaces S4, S5. The third lens L3 is a biconcave plastic lens having a negative refractive power and further having, in order toward the right, a sixth surface S6 and a seventh surface S7. The air spacing between the fifth surface S5 and the sixth surface S6 is D5. The third lens L3 has a thickness D6 along the optical axis A between the two surfaces S6, S7. The fourth lens L4 is a biconvex plastic lens having a positive refractive power and further having, in order toward the right, an eighth surface S8 and a ninth surface S9. The air spacing between the seventh surface S7 and the eighth surface S8 is D7. The fourth lens L4 has a thickness D8 along the optical axis A between the two surfaces S8, S9. The filter F1 is a light-permeable planar plate and has, in order toward the right, a tenth surface S10 and an eleventh surface S11. The air spacing between the ninth surface S9 and the tenth surface S10 is D9. The filter F1 has a thickness D10 along the optical axis A between the two surfaces S10, S11. The transparent cover plate F2 is a light-permeable planar plate and has, in order toward the right, a twelfth surface S12 and a thirteenth surface S13. The air spacing between the eleventh surface S11 and the twelfth surface S12 is D11. The transparent cover plate F2 has a thickness D12 along the optical axis A between the two surfaces S12, S13. The air spacing between the thirteenth surface S13 and the imaging plane IMA is D13.

The design principle of the miniature zoom lens system shown in FIG. 1 through FIG. 3 is described as follows. The first lens of the second lens group G2 behind the aperture stop AP (i.e., the second lens L2) is made of a material having a high refractive index (nd=1.58 or above) so as to enhance the optical power of the lens system, minimize the moving distances of the lens groups G2, and thereby shorten the overall length of the lens system, with a view to downsizing the lens system as a whole. Furthermore, all the three lenses L2, L3, and L4 of the zoom lens group and the focusing lens group (i.e., G2 and G3, respectively) have aspherical surfaces (S4 to S9), and the second lens L2 is made of a low-dispersion material (with vd=59.200). Consequently, chromatic aberration can be effectively controlled, and color saturation increased, thereby enhancing the quality of optical images. In addition, the first lens behind the aperture stop AP (i.e., the second lens L2) is made especially of glass, whose physical properties include being amorphous and highly transparent, so as to reduce scattering which is otherwise attributable to the use of excessive plastic lenses; hence, the optical properties, such as contrast and brightness, of images are improved. In order to achieve the foregoing effects, the miniature zoom lens system according to the present invention satisfies the following optical conditions:

$2.8 \leq ft/fw \leq 3.2;$ (a)

$11.5 < Dw1\text{-}2/Dw2\text{-}3 < 18.5;$ (b)

$Dt1\text{-}2/Dt2\text{-}3 < 0.2;$ (c)

$1.25 < [(Dw1\text{-}2)-(Dt1\text{-}2)]/fw < 1.95;$ (d)

$1.25 < (fw\_a)/(fg2\_a * fg3\_a) < 2.15;$ (e)

$0.32 < SQRT(fG2*fG3)/Dw < 0.50;$ (f)

$0.12 < abs(BFL\_w - BFL\_t)/fw < 0.35;$ and (g)

$6.5 < [(Dw1\text{-}2)-(Dt1\text{-}2)]/[(BFL\_w)-(BFL\_t)] < 10;$ (h)

where:

fw is the effective focal length of the miniature zoom lens system when the second lens group G2 and the third lens group G3 are in the wide-angle position (as shown in FIG. 1);

ft is the effective focal length of the miniature zoom lens system when the second lens group G2 and the third lens group G3 are in the telephoto position (as shown in FIG. 3);

Dw1-2 is the air spacing between the first lens group G1 and the second lens group G2 when the second lens group G2 and the third lens group G3 are in the wide-angle position, i.e., D2+D3;

Dw2-3 is the air spacing between the second lens group G2 and the third lens group G3 when the second lens group G2 and the third lens group G3 are in the wide-angle position, i.e., D7;

Dt1-2 is the air spacing between the first lens group G1 and the second lens group G2 when the second lens group G2 and the third lens group G3 are in the telephoto position, i.e., D2+D3;

Dt2-3 is the air spacing between the second lens group G2 and the third lens group G3 when the second lens group G2 and the third lens group G3 are in the telephoto position, i.e., D7;

fG2 is the effective focal length of the second lens group G2;

fG3 is the effective focal length of the third lens group G3;

Dw is the overall length of the miniature zoom lens system (hereinafter referred to as total optical length TT) when the second lens group G2 and the third lens group G3 are in the wide-angle position, i.e., the total distance from S1 to IMA;

SQRT means taking square root;

fg2 is the effective focal length of the second lens L2;

fg3 is the effective focal length of the third lens L3;

abs means taking absolute value;

$fg2\_a = 1/abs(fg2);$ $fg3\_a = 1/abs(fg3);$ $fw\_a = 1/abs(fw);$

BFL_w is the back focal length of the miniature zoom lens system when the second lens group G2 and the third lens group G3 are in the wide-angle position, i.e., the distance from S9 to IMA; and BFL_t is the back focal length of the miniature zoom lens system when the second lens group G2 and the third lens group G3 are in the telephoto position, i.e., the distance from S9 to IMA.

A detailed description of each of the aforesaid optical conditions (a) to (h) is given below.

$2.8 \leq ft/fw \leq 3.2:$ (a)

The value of ft/fw represents the optical zoom ratio of the miniature zoom lens system of the present invention. Therefore, the optical zoom ratio of the miniature zoom lens system of the present invention ranges from 2.8× to 3.2×, which is generally regarded, and noted in product specifications, as a zoom ratio (magnification ratio) of 3×.

$11.5 < Dw1\text{-}2/Dw2\text{-}3 < 18.5$ and (b)

$Dt1\text{-}2/Dt2\text{-}3 < 0.2:$ (c)

The conditions (b) and (c) specify the ratio between the moving distance of the zoom lens group (i.e., the second lens group G2) and the moving distance of the focusing lens group (i.e., the third lens group G3) when the miniature zoom lens system of the present invention is in the wide-angle position and the telephoto position, respectively. If these two conditions are satisfied, the overall length (from S1 to IMA) and volume of the lens system of the present invention can be effectively minimized while the zoom ratio ranges from 2.8× to 3.2×; besides, the lens system of the present invention also provides such optical performances as aberration reduction and enhancement of image quality and resolution. If the value of Dw1-2/Dw2-3 is smaller than the lower limit of 11.5 when the miniature zoom lens system of the present invention is in the wide-angle position, there is insufficient moving space in the limited total optical length TT that can be used for optical zooming. As a result, the total optical length TT must be increased, and the lens system will be enlarged accordingly. The same problem will occur if the value of Dt1-2/Dt2-3 is larger than the upper limit of 0.2. Moreover, if the value of Dw1-2/Dw2-3 is larger than the upper limit of 18.5 when the miniature zoom lens system is in the wide-angle position, field curvature will not easily converge, and hence the image will be clear in some areas but blurry in the others. At the same time, distortion will diverge and make straight objects look curved in the image taken.

$$1.25 < [(Dw1\text{-}2) - (Dt1\text{-}2)]/fw < 1.95: \tag{d}$$

This condition defines the moving distance of the zoom lens group (i.e., the second lens group G2) of the miniature zoom lens system according to the present invention and thereby limits the zoom ratio and the overall length (from S1 to IMA) of the lens system. Ideally, the difference between Dw1-2 and Dt1-2 is small (i.e., the moving distance is small), which means that the lenses have a high optical power. In consequence, a zoom ratio of 3× can be achieved within the limited overall length (from S1 to IMA) of the lens system. If the value of [(Dw1-2)−(Dt1-2)]/fw is smaller than the lower limit, an insufficient zoom ratio and divergence of distortion ensue, thus leading to distorted images of straight objects. However, if the value of [(Dw1-2)−(Dt1-2)]/fw is larger than the upper limit, aberration will not converge when the zoom ratio is approximately 3×, and image quality will be poor (e.g., the image will look blurry).

$$1.25 < (fw\_a)/(fg2\_a * fg3\_a) < 2.15: \tag{e}$$

This condition ensures that the zoom lens group (i.e., the second lens group G2) of the miniature zoom lens system according to the present invention has a high optical power such that a magnification (zoom) ratio of 2.8× to 3.2× is attainable with a reduced overall length (from S1 to IMA) of the lens system but without compromising the optical performance of the lens system. As the miniature zoom lens system must meet the requirements of a low-profile system module, the effective focal length (EFL) of the lens system has to be short. Given a limited focal length, it is necessary to increase the optical power of the zoom lens group (G2) so as to obtain the desired zoom ratio. In the present invention, the first lens of the zoom lens group (i.e., the second lens group G2) behind the aperture stop AP (i.e., the second lens L2) has two aspherical surfaces. This design not only increases the optical power of the lens and thereby improves the performance of the lens group, but also effectively suppresses aberration, thus enhancing image quality. Hence, the optical power of the zoom lens group is increased by fg2, and in consequence the effect of fg3 is also enhanced. The second lens L2 in the present invention is made of glass and disposed immediately behind the aperture stop AP to effectively reduce scattering, improve the efficiency of light admittance, and thereby intensify image contrast and brightness. If the value of (fw_a)/(fg2_a*fg3_a) exceeds the limits, the variation of focal length of the lens system will affect the degree of aberration and have serious impact on resolution, which is an important factor in image quality. Therefore, the condition (e) is particularly applicable to achieving an optimal balance of the value of (fw_a)/(fg2_a*fg3_a) in a low-profile system module (i.e., the miniature zoom lens system) so that a short total optical length TT and high image quality are obtainable at the same time.

$$0.32 < \text{SQRT}(fG2 * fG3)/Dw < 0.50: \tag{f}$$

This condition specifies the relationship between the overall optical power of the zoom lens group (i.e., the second lens group G2) and the focusing lens group (i.e., the third lens group G3) and the overall length (from S1 to IMA) of the miniature zoom lens system according to the present invention, so that optical aberration can be reduced, and image quality enhanced, under the condition of a low profile. When the condition (f) is satisfied, the overall optical power of the zoom lens group (i.e., the second lens group G2) and the focusing lens group (i.e., the third lens group G3) is high. Therefore, the moving distances of the lens groups can be shortened to reduce the overall length (from S1 to IMA) of the lens system. The four surfaces of the two lenses L2, L3 in the zoom lens group (i.e., the second lens group G2) are all aspherical surfaces, which can effectively suppress aberration, enhance image quality, and contribute to the aberration correction ability of the zoom lens group (i.e., the third lens group G3). In addition, the two surfaces of the lens L4 in the focusing lens group (i.e., the third lens group G3) are also aspherical surfaces so as to effectively suppress astigmatism and chromatic aberration, thus enabling a low-profile system to provide high image quality. If the value of SQRT(fG2× fG3)/Dw exceeds the limits set forth in the present condition, the overall length (from S1 to IMA) of the lens system cannot be reduced, and it will be difficult to suppress aberration, particularly astigmatism, which results in image doubling.

$$0.12 < \text{abs}(BFL\_w - BFL\_t)/fw < 0.35: \tag{g}$$

This condition specifies the difference of back focal length of the miniature zoom lens system according to the present invention between the wide-angle position and the telephoto position, with a view to reducing the overall length (from S1 to IMA) of the lens system. An appropriate back focal length (BFL) is important when the overall length (from S1 to IMA) of the lens system is under limitation. An excessively short back focal length makes it impossible to package the lens system module to the image sensor module and to reserve a space for focusing. On the other hand, an excessively long back focal length increases the overall length (from S1 to IMA) of the lens system, leads to ineffective suppression of aberration, and also lowers image resolution. The limitation on the back focal length is conducive to finding a balance between the overall length (from S1 to IMA) and aberration of the lens system. If the present condition is satisfied, a low-file system can be easily accomplished while noises arising from aberration are effectively suppressed. If the value of abs(BFL_w−BFL_t)/fw is smaller than the lower limit, the zoom ratio of the lens system will be insufficient, and hence distortion is likely to diverge such that images taken of a straight object are distorted. If the value of abs(BFL_w−BFL_t)/fw is larger than the upper limit, the overall length (from S1 to IMA) of the lens system will be increased, aberration cannot be effectively suppressed, and image quality, particularly resolution, will be compromised.

$$6.5 < [(Dw1\text{-}2) - (Dt1\text{-}2)]/[(BFL\_w) - (BFL\_t)] < 10: \tag{h}$$

This condition specifies the relationship between the moving distance of the zoom lens group (i.e., the second lens group G2) and the difference of back focal length. A small difference between Dw1-2 and Dt1-2 signifies a small moving distance during zooming. With an appropriate back focal length, the overall length of the lens system can be effectively reduced, thus allowing aberration to converge more easily, increasing the optical power of the lenses, and improving image quality, particularly resolution. If the value of [(Dw1-2)−(Dt1-2)]/[(BFL_w)−(BFL_t)] is smaller than the lower limit, the back focal length compensation is huge, and in consequence the overall length (from S1 to IMA) of the lens system cannot be effectively reduced. However, if the value of [(Dw1-2)−(Dt1-2)]/[(BFL_w)−(BFL_t)] is larger than the upper limit, it is relatively difficult for aberration to converge, and the back focal length tends to be insufficient for focusing.

Please refer to Table 1 and Table 2 for the various parameters of the miniature zoom lens system according to the first preferred embodiment of the present invention as shown in FIGS. 1 through 3. In the tables, the unit for all thicknesses, distances, diameters or radii, and positions is mm.

TABLE 1

Overall optical parameters of the miniature zoom lens system according to the first preferred embodiment of the present invention

|  | Wide-angle position (W) | Middle position (M) | Telephoto position (T) |
| --- | --- | --- | --- |
| a Object distance |  | Infinity (∞) |  |
| b Focal length of lens system | fw 4.48 | fm 9.02 | Ft 13.3 |
| c Magnification ratio |  | 2.97 |  |
| d F-number | 3.45 | 5.25 | 6.15 |
| e Position of exit pupil in the system | −6.63 | −34.10 | −748.10 |
| Angle of view (2ω) (°) | 43.53 | 24.75 | 18.78 |
| f Total length of lenses (Distance from S1 to S9) | 10.32 | 11.40 | 10.95 |
| g Overall length of lens system (Air spacing between S1 and IMA) |  | 15.25 |  |
| h Back focal length (Air spacing between S9 and IMA) | 3.61 | 2.53 | 2.99 |
| i Focal length of first lens group (fG1) |  | −15.76 |  |
| j Focal length of second lens group (fG2) |  | 5.38 |  |
| k Focal length of third lens group (fG3) |  | 8.89 |  |
| l Focal length of second lens (fg2) |  | 2.66 |  |

TABLE 2

Optical parameters of the various lenses in the miniature zoom lens system according to the first preferred embodiment of the present invention

| Surface | Radius of curvature | Distance on optical axis | Refractive index (d line) | Abbe number |
| --- | --- | --- | --- | --- |
| S1 | R1 −21.480 | D1 0.799 | N1 1.517 | v1 64.167 |
| S2 | R2 13.280 | D2 variable |  |  |
| S3 | R3 infinity (aperture stop) | D3 0 |  |  |
| S4* | R4 2.089 | D4 1.815 | N2 1.584 | v2 59.200 |
| S5* | R5 −4.121 | D5 0.303 |  |  |
| S6* | R6 −4.934 | D6 0.769 | N3 1.585 | v3 29.909 |
| S7* | R7 1.977 | D7 variable |  |  |
| S8* | R8 13.479 | D8 1.308 | N4 1.531 | v4 56.000 |
| S9* | R9 −7.028 | D9 variable |  |  |
| S10 | R10 infinity | D10 0.3 | N5 1.523 | v5 55.000 |
| S11 | R11 infinity | D11 0.045 |  |  |
| S12 | R12 infinity | D12 0.4 0.255 | N6 1.526 | v6 62.200 |
| S13 | R13 infinity | D13 |  |  |

*denotes an aspherical surface.

In Table 2, the curved surfaces S4, S5, S6, S7, S8, and S9 are even aspherical surfaces defined by the following aspherical equation:

$$z = \frac{cr^2}{1+\sqrt{1-(1+k)c^2r^2}} + A_4 r^4 + A_6 r^6 + A_8 r^8 + A_{10} r^{10} + A_{12} r^{12}$$

where c is the curvature at a point along the aspherical surface; r is the distance from that point to the optical axis; k is a conical coefficient; and A4, A6 . . . A12 are $4^{th}$-, $6^{th}$-, . . . , $12^{th}$-order aspherical coefficients, respectively.

In Table 2, the coefficients for S4 are:
k: 0.041315,
A4: −0.000537186,
A6: 0.00414651,
A8: −0.00911798,
A10: 0.00600987,
A12: −0.00000987644;
the coefficients for S5 are:
k: −1E+40,
A4: −0.023799,
A6: −0.00669498,
A8: 0.00528438,
A10: −0.00116310,
A12: −0.00805505;
the coefficients for S6 are:
k: −1E+40,
A4: −0.11309,
A6: −0.0346800,
A8: 0.0831200,
A10: −0.0873073,
A12: −0.0115358;
the coefficients for S7 are:
k: −5.1730,
A4: −0.0004599,
A6: 0.00405659,
A8: −0.0119315,
A10: 0.0197155,
A12: −0.0143832;
the coefficients for S8 are:
k: −10.85,
A4: 0.00507425,
A6: −0.00161466,
A8: 0.0003443,
A10: −0.00000544202,
A12: −0.0000041062;
and the coefficients for S9 are:
k: 0.59459,
A4: 0.0052912,
A6: −0.00134145,
A8: 0.0000447719,
A10: 0.0000523375,
A12: −0.00000142676.

When designed with the foregoing coefficients, the miniature zoom lens system of the present invention is configured as a three-lens-group four-lens structure that satisfies the aforesaid conditions (a) to (h) and provides a zoom ratio of approximately 3× while having a reduced overall length as well as enhanced optical quality.

Figure 4A:
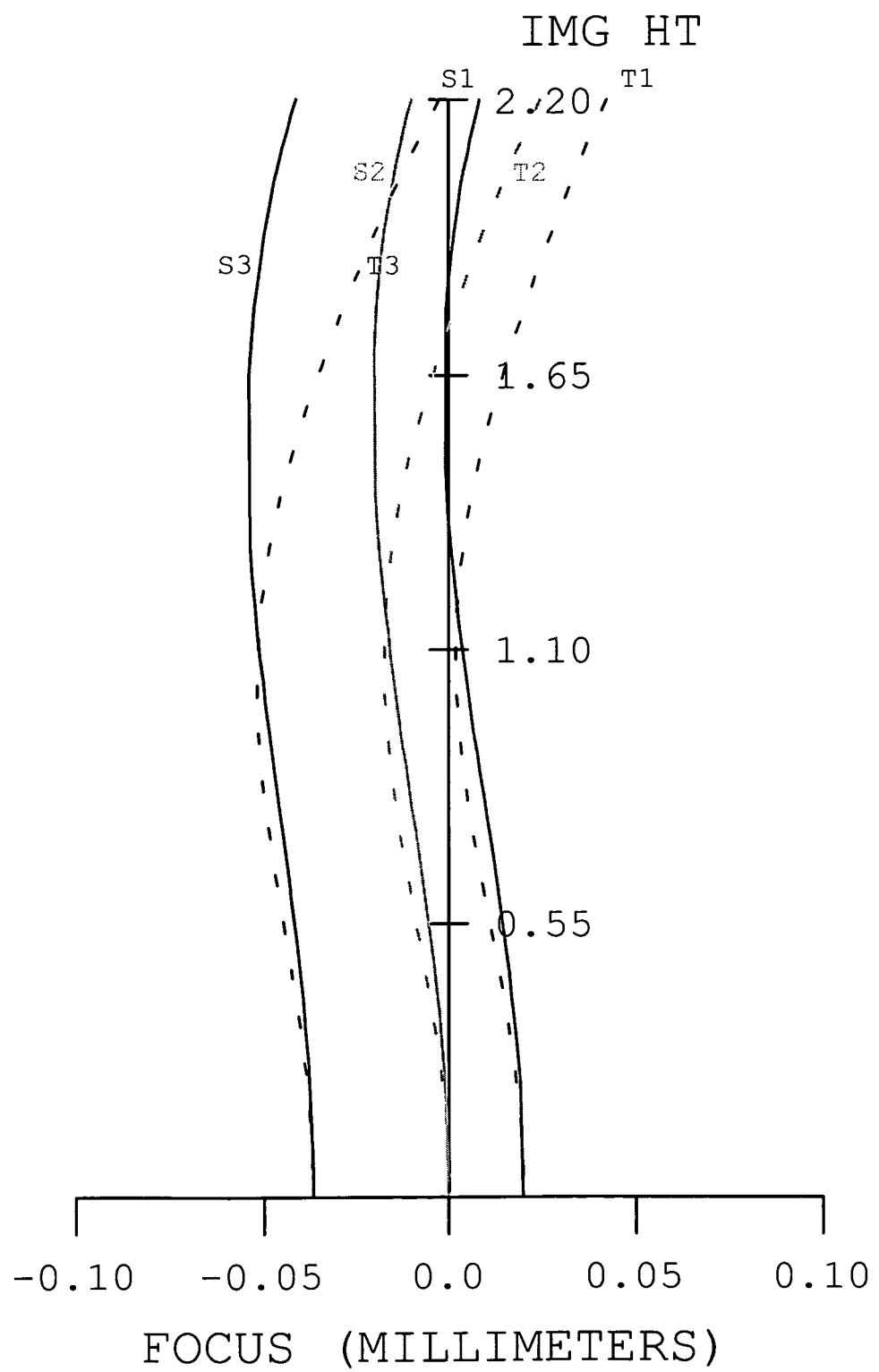
FIGS. 4A, 4B, and 4C respectively show astigmatism curves, distortion curves, and lateral color curves of the miniature zoom lens system according to the first preferred embodiment of the present invention when the miniature zoom lens system is in the wide-angle position illustrated in FIG. 1.
Figure 4B:
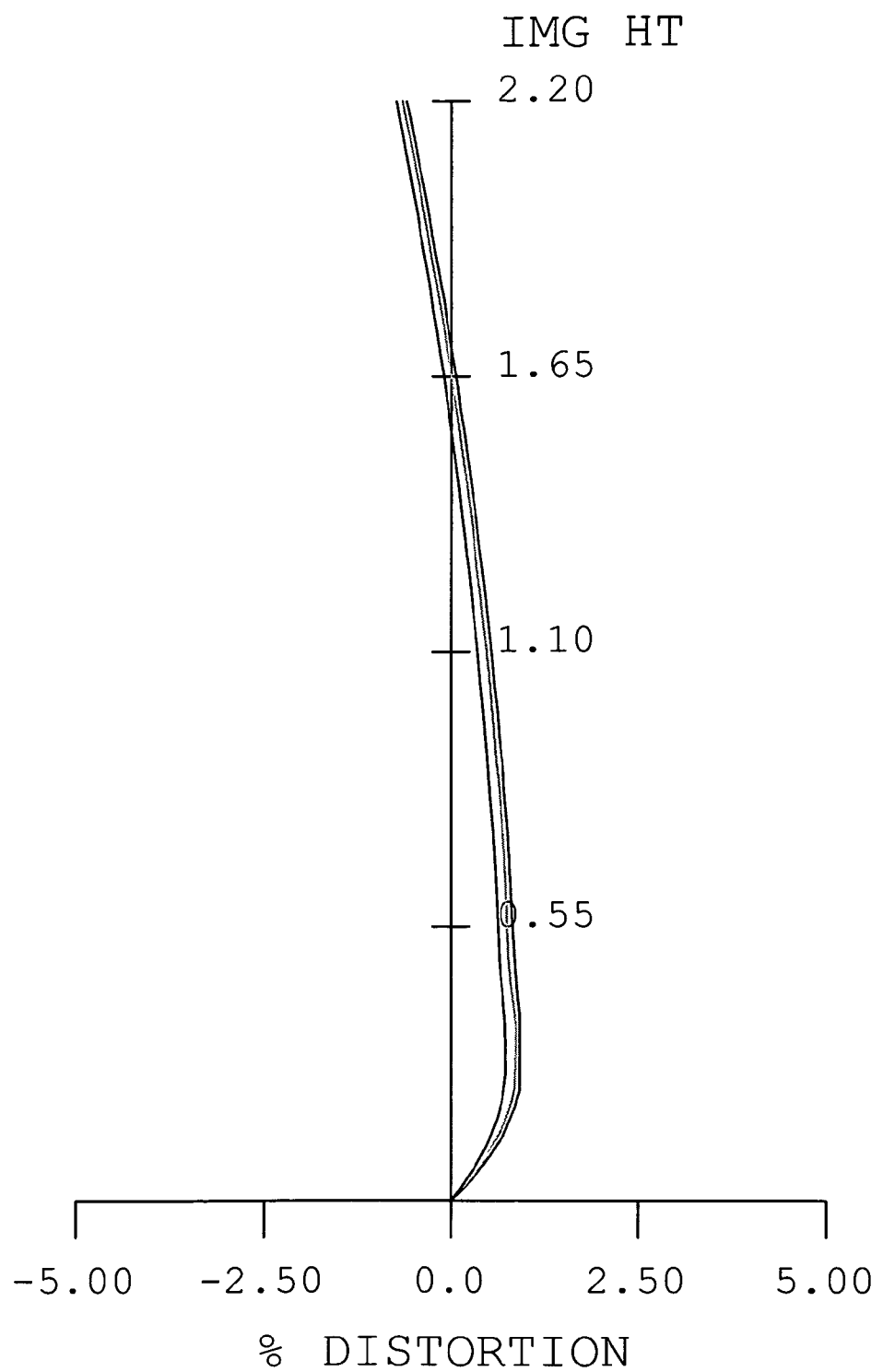
Figure 4C:
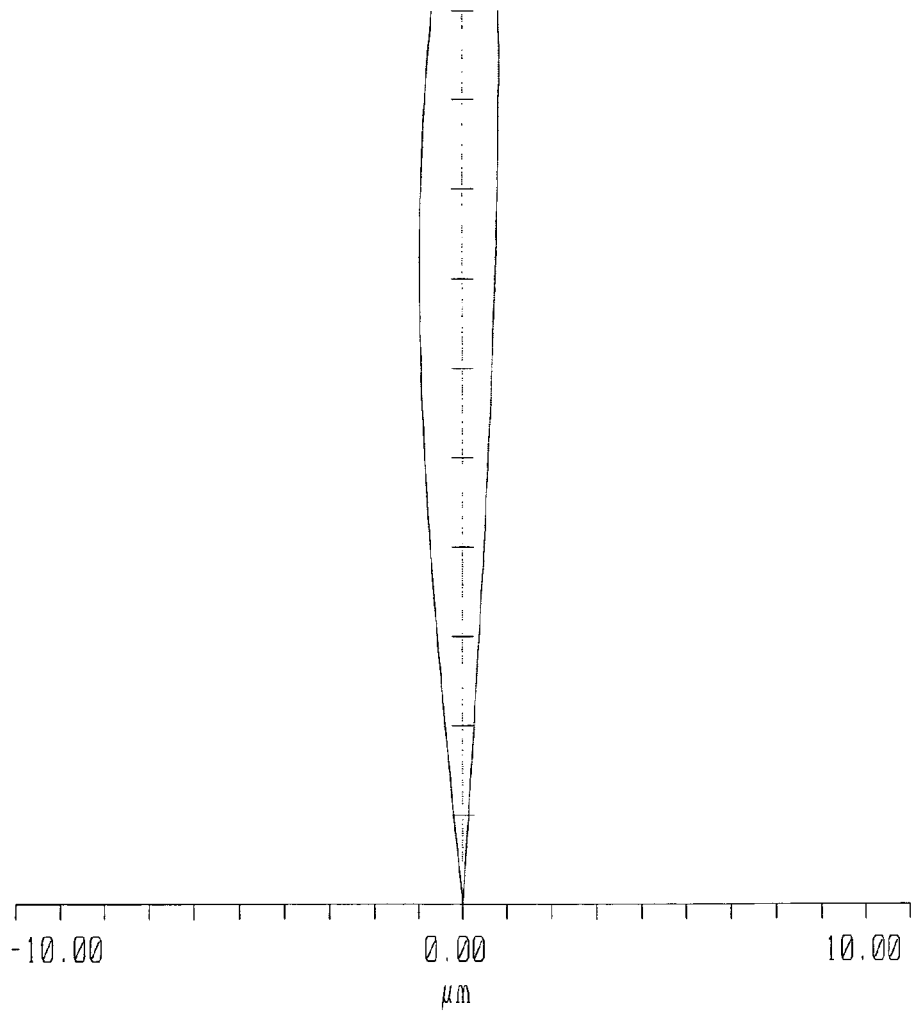
Figure 5A:
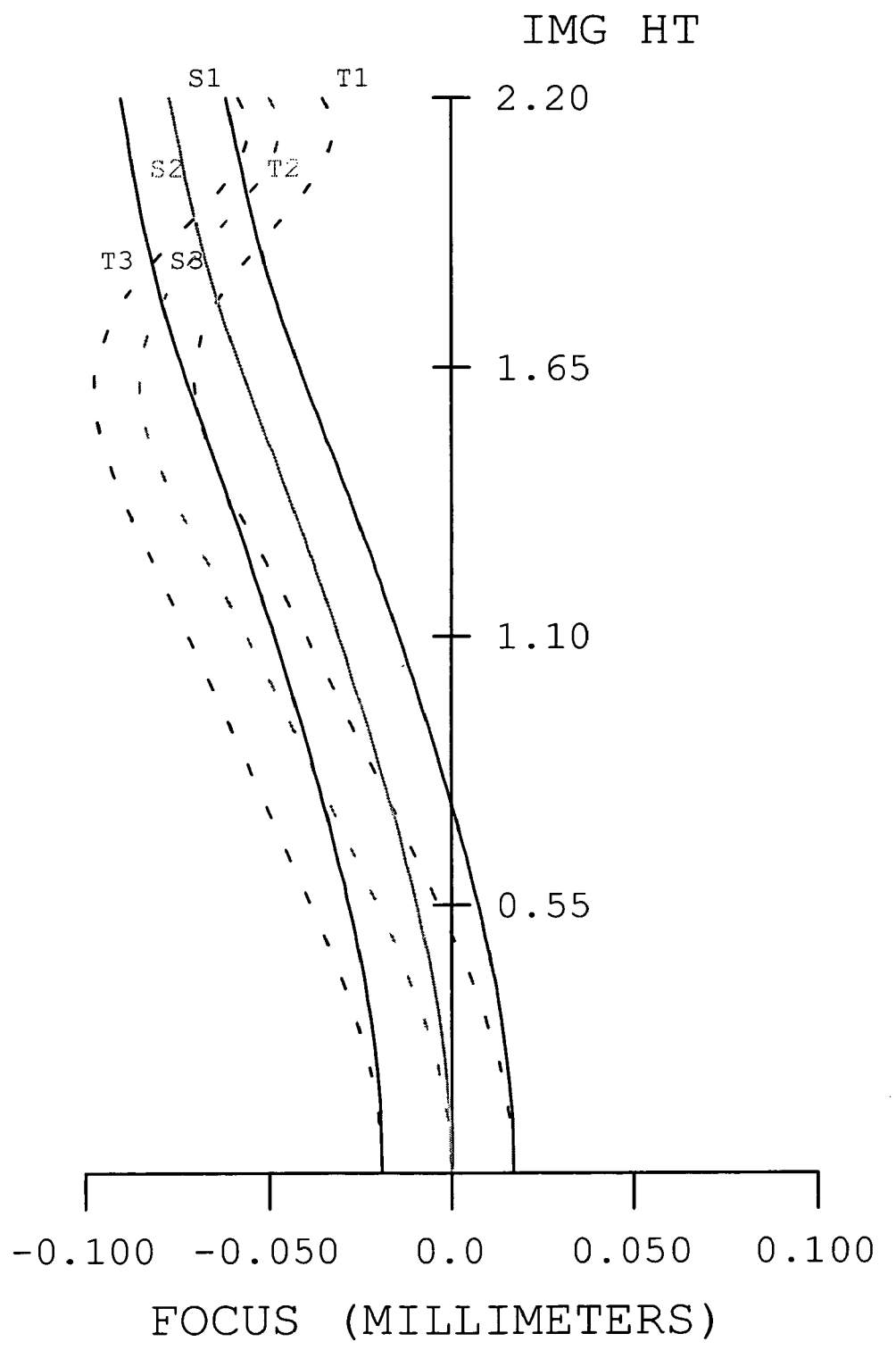
FIGS. 5A, 5B, and 5C respectively show astigmatism curves, distortion curves, and lateral color curves of the miniature zoom lens system according to the first preferred embodiment of the present invention when the miniature zoom lens system is in the middle position illustrated in FIG. 2.
Figure 5B:
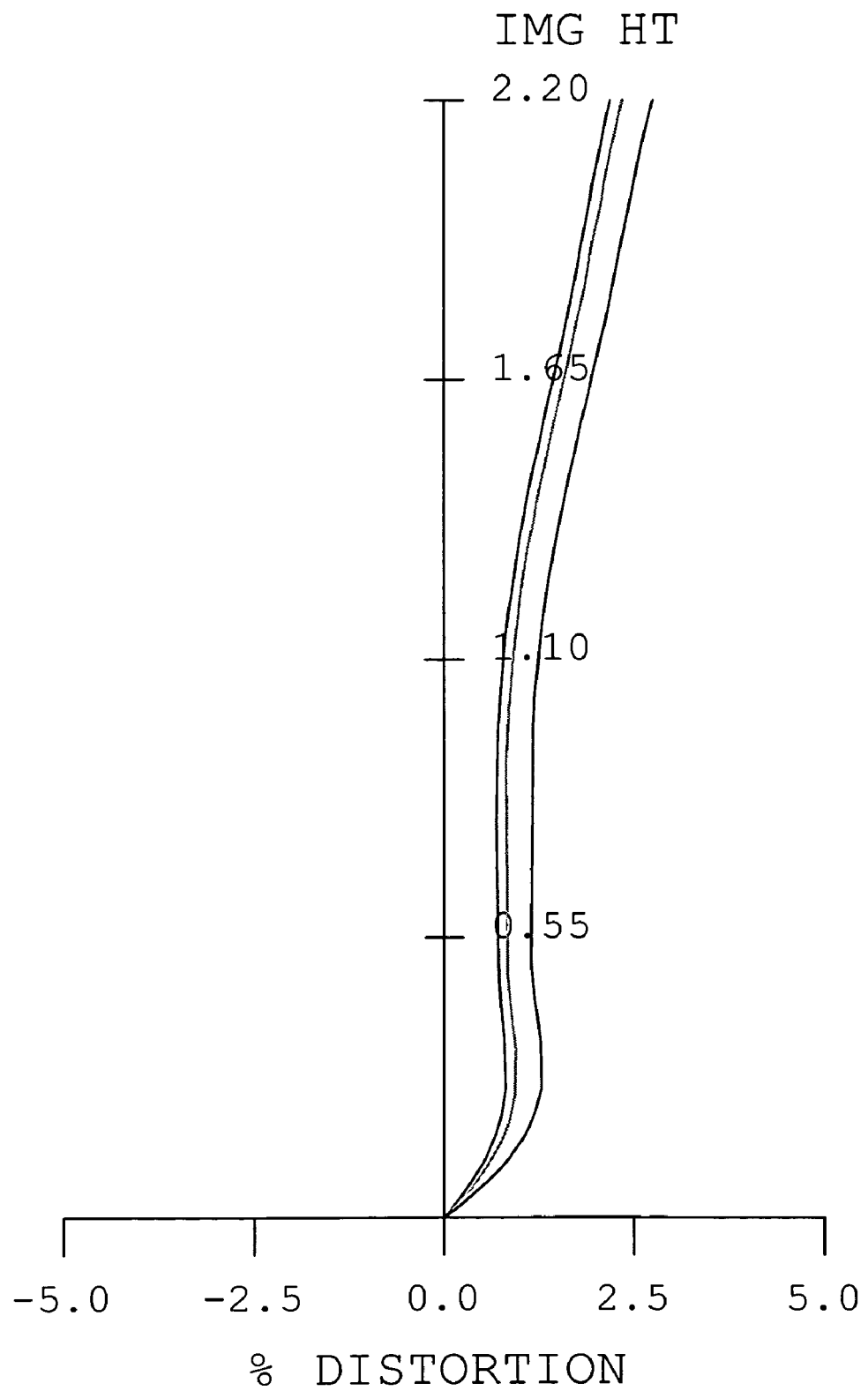
Figure 5C:
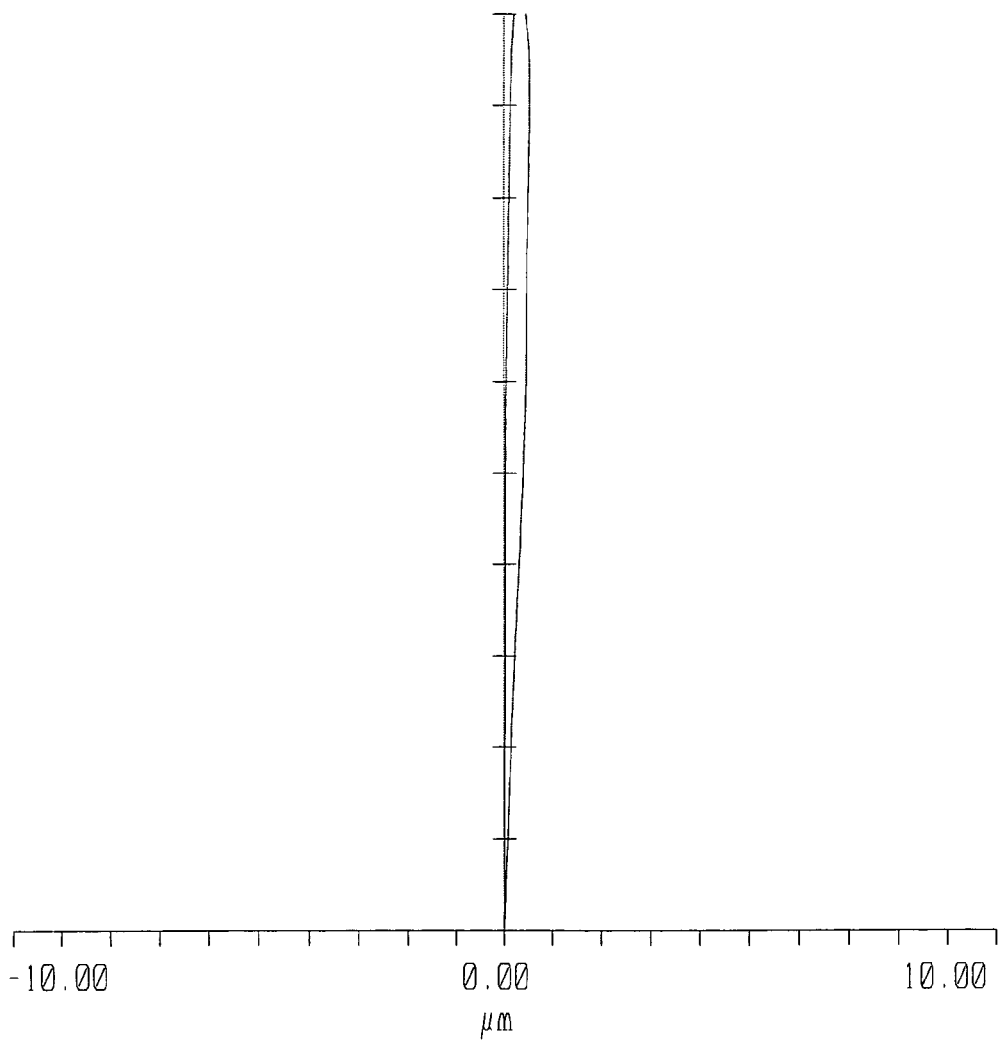
Figure 6A:
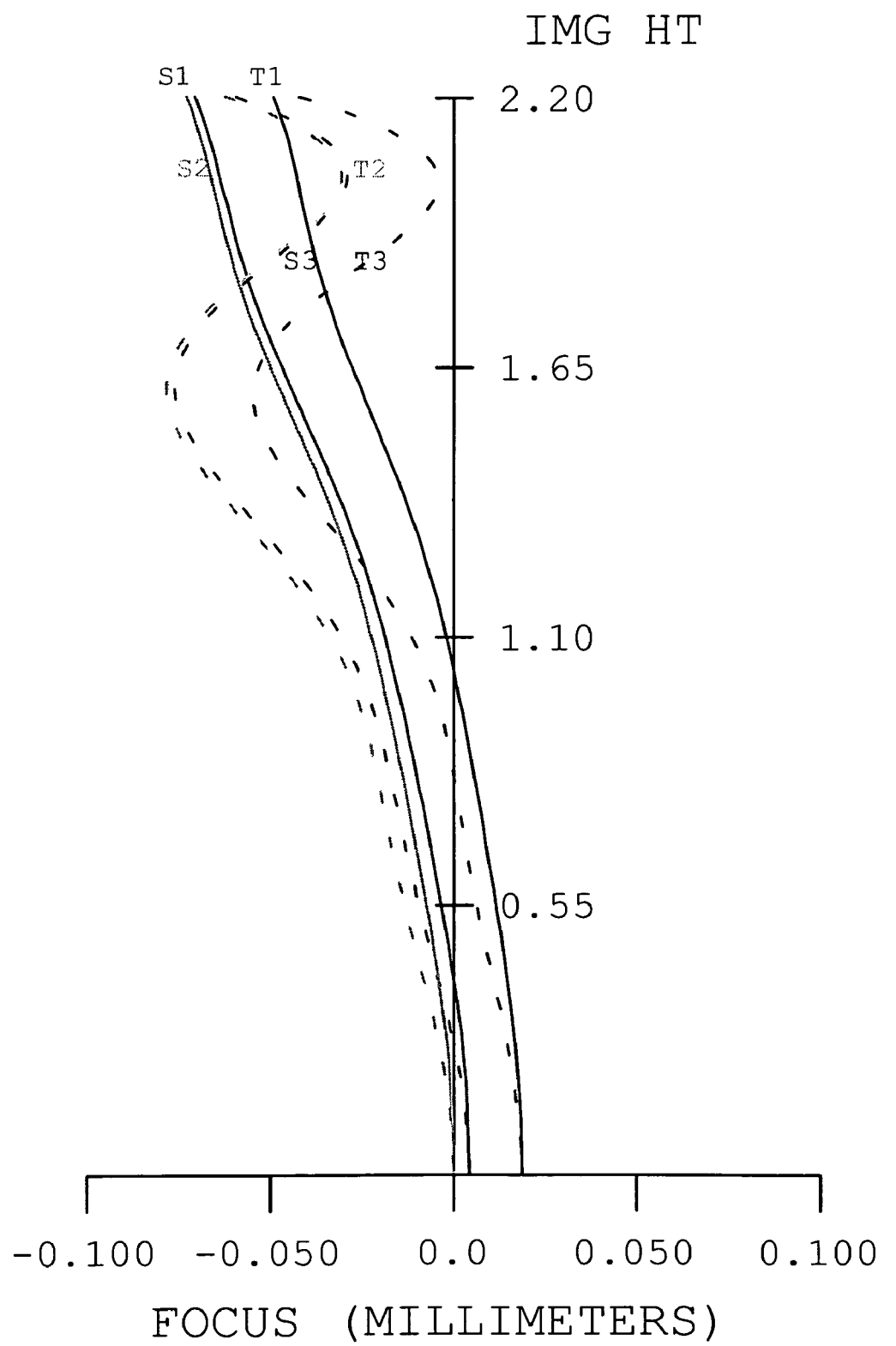
FIGS. 6A, 6B, and 6C respectively show astigmatism curves, distortion curves, and lateral color curves of the miniature zoom lens system according to the first preferred embodiment of the present invention when the miniature zoom lens system is in the telephoto position illustrated in FIG. 3.
Figure 6B:
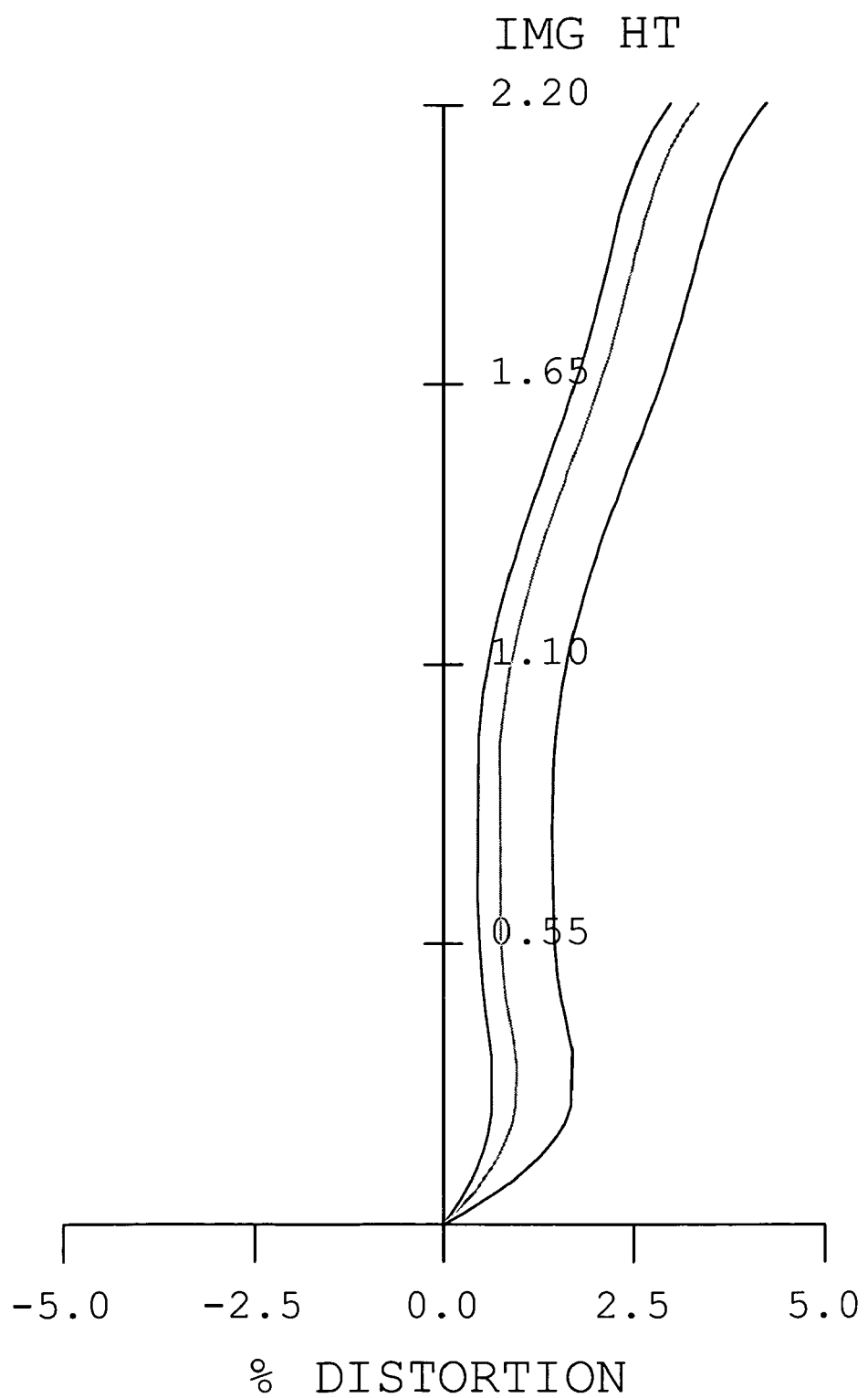
Figure 6C:
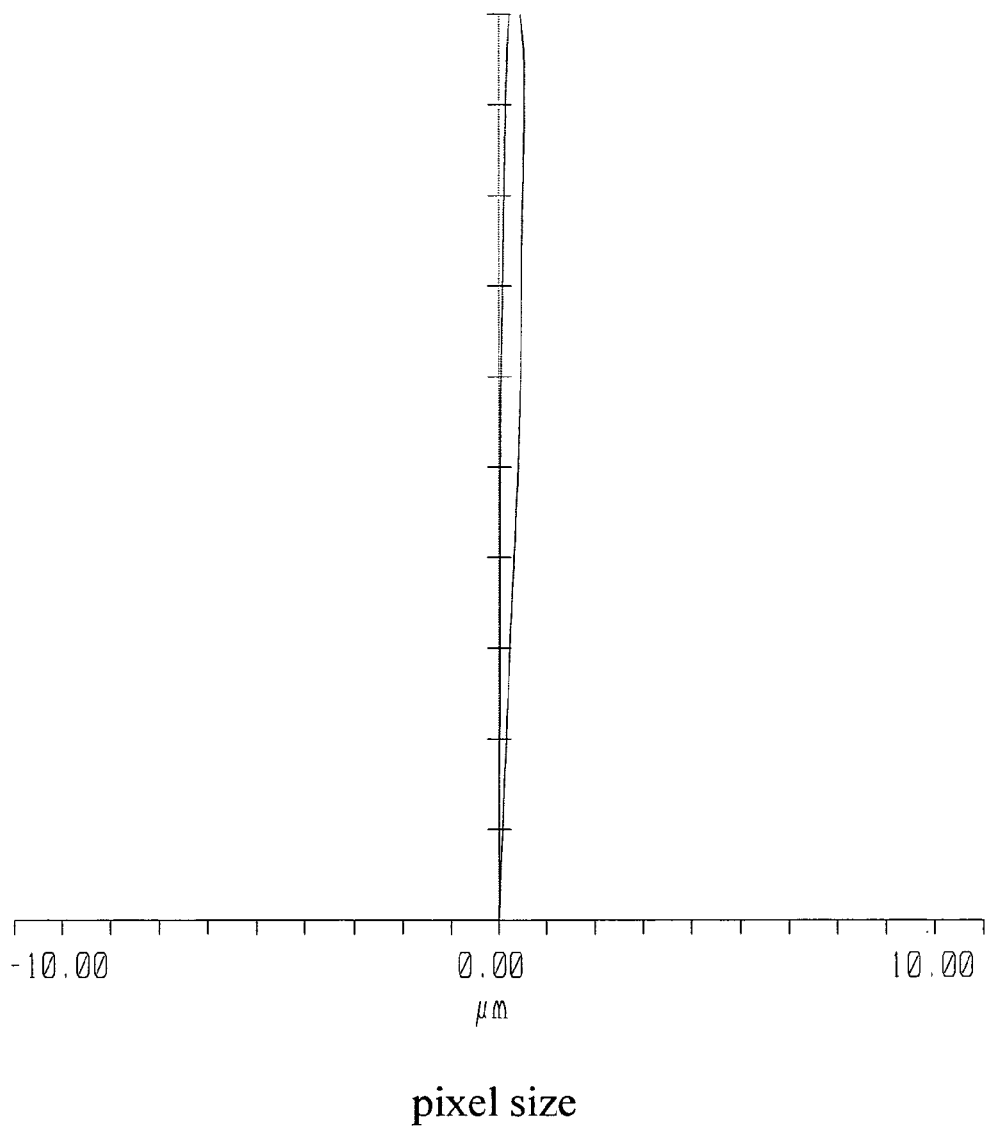

Pleas refer to FIGS. 4A, 4B, and 4C respectively for astigmatism curves, distortion curves, and lateral color curves of the miniature zoom lens system according to the first preferred embodiment of the present invention when the miniature zoom lens system is in the wide-angle position illustrated in FIG. 1; to FIGS. 5A, 5B, and 5C respectively for astigmatism curves, distortion curves, and lateral color curves of the miniature zoom lens system according to the first preferred embodiment of the present invention when the miniature zoom lens system is in the middle position illustrated in FIG. 2; and to FIGS. 6A, 6B, and 6C respectively for astigmatism curves, distortion curves, and lateral color curves of the miniature zoom lens system according to the first preferred embodiment of the present invention when the miniature zoom lens system is in the telephoto position illustrated in FIG. 3. The curves in the aforementioned drawings demonstrate that the miniature zoom lens system according to the first preferred embodiment of the present invention provides good optical performance and high image quality.

Described below is another preferred embodiment of the present invention, wherein most of the components are identical or similar to those in the first preferred embodiment. For the sake of simplicity, the identical components are designated by the same names and reference numerals as in the first preferred embodiment Please refer to FIG. 7, FIG. 8, and FIG. 9 for side views of the structure and optical path of a miniature zoom lens system according to a second preferred embodiment of the present invention, wherein the miniature zoom lens system is in a wide-angle position, a middle position, and a telephoto position, respectively. As in the first preferred embodiment shown in FIG. 1, the miniature zoom lens system according to the second preferred embodiment also includes three lens groups G1 to G3, which consist of four lenses L1 to L4 in total. Similarly, the first lens group G1 is fixed in position while the second and the third lens groups G2, G3 are movable. Also, the second lens group G2 includes two lenses L2, L3, and an aperture stop AP is disposed in front of, and to the left of, the second lens L2 and is movable with the second lens group G2. The second preferred embodiment shown in FIG. 7 differs from the first preferred embodiment mainly in that the third lens L3 in the second preferred embodiment has a convex left surface S6 in addition to a concave right surface L7. Nevertheless, the third lens L3 in the second preferred embodiment remains a plastic lens with a negative refractive power.

Figure 7:
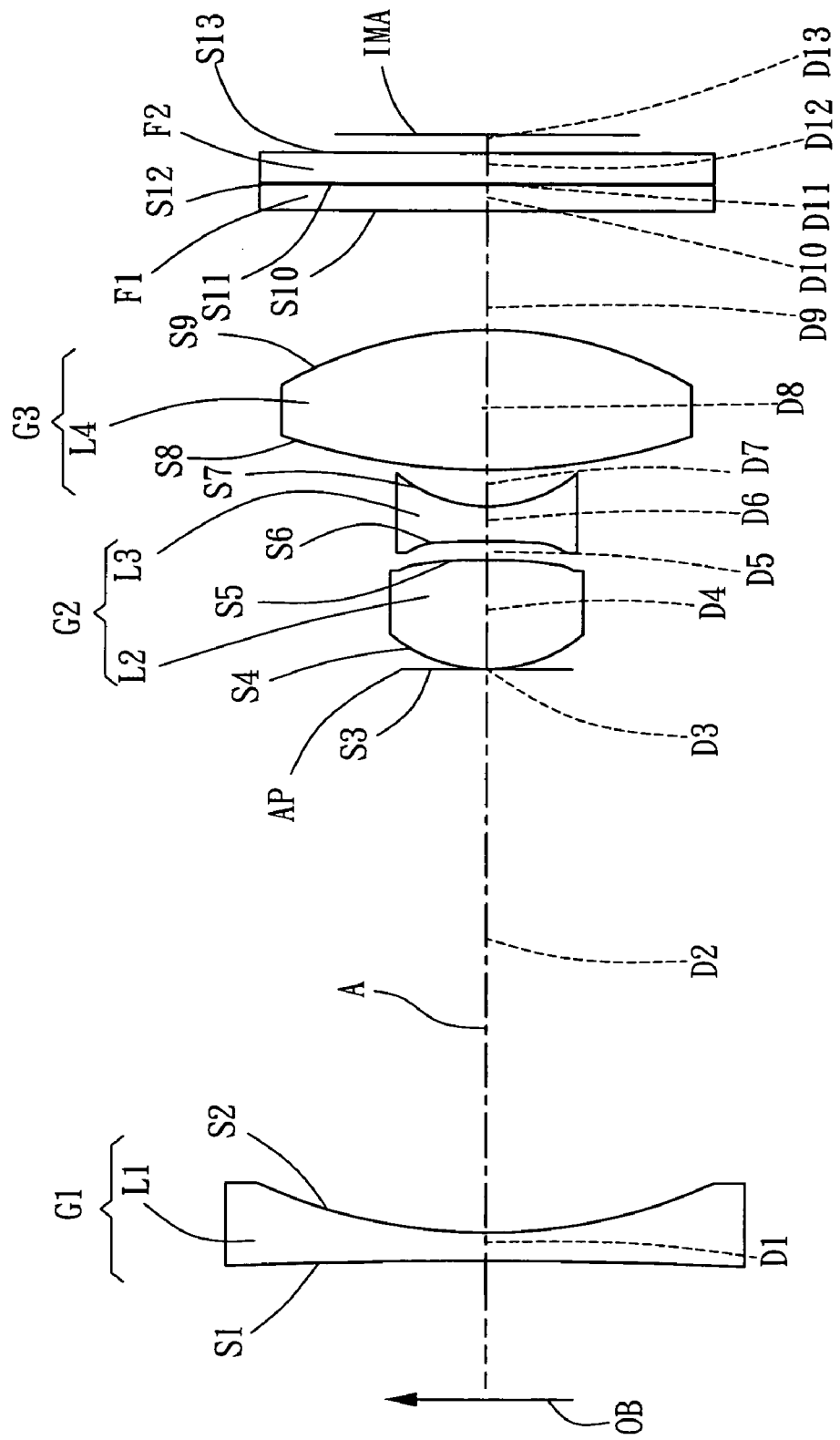
FIG. 7 is a side view of the structure and optical path of a miniature zoom lens system according to a second preferred embodiment of the present invention, wherein the miniature zoom lens system is in a wide-angle position.
Figure 8:
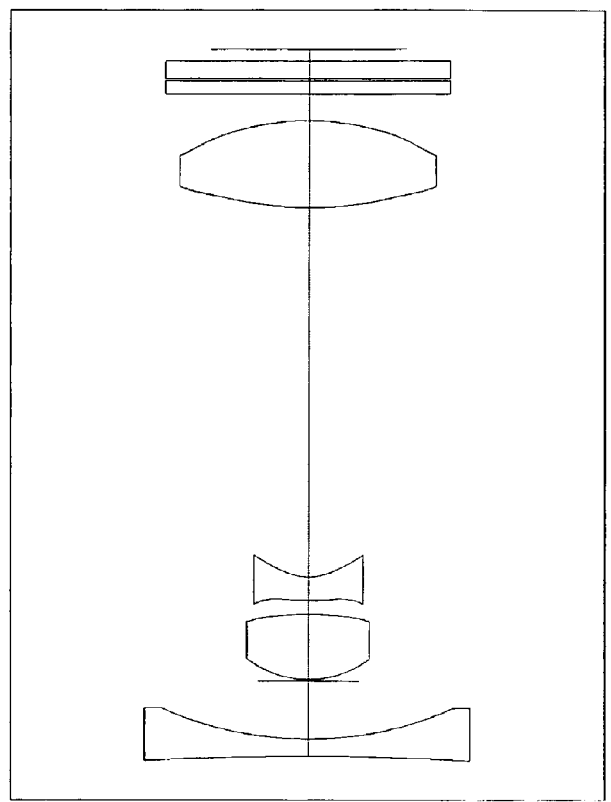
FIG. 8 is a side view of the structure and optical path of the miniature zoom lens system according to the second preferred embodiment of the present invention, wherein the miniature zoom lens system is in a middle position.
Figure 9:
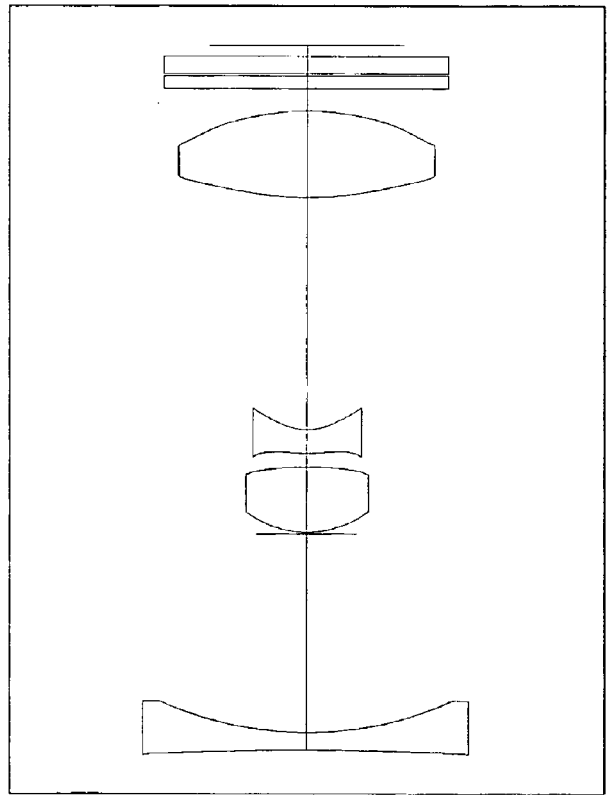
FIG. 9 is a side view of the structure and optical path of the miniature zoom lens system according to the second preferred embodiment of the present invention, wherein the miniature zoom lens system is in a telephoto position.

Please refer to Table 3 and Table 4 for the various parameters of the miniature zoom lens system according to the second preferred embodiment of the present invention as shown in FIGS. 7 through 9. In the tables, the unit for all thicknesses, distances, diameters or radii, and positions is mm.

TABLE 3

Overall optical parameters of the miniature zoom lens system according to the second preferred embodiment of the present invention

| | Wide-angle position (W) | Middle position (M) | Telephoto position (T) |
|---|---|---|---|
| a Object distance | | Infinity (∞) | |
| b Focal length of lens system | fw | fm | Ft |
| | 4.04 | 7.91 | 12.59 |
| c Magnification ratio | | 3.12 | |
| d F-number | 2.84 | 5.20 | 6.00 |
| e Position of exit pupil in the system | −6.62 | 39.86 | 13.08 |
| Angle of view (2ω) (°) | 57.39 | 30.82 | 20.09 |
| f Total length of lenses (Distance from S1 to S9) | 13.23 | 14.50 | 14.40 |
| g Overall length of lens system (Air spacing between S1 and IMA) | | 16.00 | |
| h Back focal length (Air spacing between S9 and IMA) | 2.68 | 1.50 | 1.60 |

TABLE 3-continued

Overall optical parameters of the miniature zoom lens system according to the second preferred embodiment of the present invention

| | Wide-angle position (W) | Middle position (M) | Telephoto position (T) |
|---|---|---|---|
| i Focal length of first lens group (fG1) | | −14.50 | |
| j Focal length of second lens group (fG2) | | 6.74 | |
| k Focal length of third lens group (fG3) | | 6.06 | |
| l Focal length of second lens (fg2) | | 3.02 | |

TABLE 4

Optical parameters of the various lenses in the miniature zoom lens system according to the second preferred embodiment of the present invention

| Surface | | Radius of curvature | Distance on optical axis | Refractive index (d line) | Abbe number |
|---|---|---|---|---|---|
| S1 | R1 | −71.997 | D1 | 0.4 | N1 1.497 | v1 81.608 |
| S2 | R2 | 8.047 | D2 | variable | | |
| S3 | R3 | infinity (aperture stop) | D3 | 0.038 | | |
| S4* | R4 | 2.253 | D4 | 1.483 | N2 1.584 | v2 59.200 |
| S5* | R5 | −6.321 | D5 | 0.315 | | |
| S6* | R6 | 4.038 | D6 | 0.531 | N3 1.585 | v3 29.909 |
| S7* | R7 | 1.084 | D7 | variable | | |
| S8* | R8 | 7.714 | D8 | 1.975 | N4 1.531 | v4 56.044 |
| S9* | R9 | −5.067 | D9 | variable | | |
| S10 | R10 | Infinity | D10 | 0.3 | N5 1.523 | v5 55.000 |
| S11 | R11 | Infinity | D11 | 0.045 | | |
| S12 | R12 | Infinity | D12 | 0.4 | N6 1.526 | v6 62.200 |
| S13 | R13 | infinity | D13 | 0.255 | | |

*denotes an aspherical surface.

In Table 4, the curved surfaces S4, S5, S6, S7, S8, and S9 are even aspherical surfaces defined by the following aspherical equation:

$$z = \frac{cr^2}{1 + \sqrt{1 - (1+k)c^2 r^2}} + A_4 r^4 + A_6 r^6 + A_8 r^8 + A_{10} r^{10} + A_{12} r^{12}$$

where c is the curvature at a point along the aspherical surface; r is the distance from that point to the optical axis; k is a conical coefficient; and A4, A6 . . . A12 are $4^{th}$-, $6^{th}$-, . . . , $12^{th}$-order aspherical coefficients, respectively.

In Table 4, the coefficients for S4 are:
k: 0.0447924953,
A4: 0.000173204142,
A6: 0.00008022267316,
A8: 0.0008263856650,
A10: −0.000822692123,
A12: 0;
the coefficients for S5 are:
k: 0.5344637324,
A4: 0.01265924467,
A6: 0.008019207242,
A8: −0.01121830740,
A10: 0.0006596770887,
A12: 0;

the coefficients for S6 are:
k: −63.70188459,
A4: −0.05138656552,
A6: −0.01251981618,
A8: −0.007893416053,
A10: 0.02028488949,
A12: −0.02705964333;
the coefficients for S7 are:
k: −4.23903491,
A4: 0.1088232336,
A6: −0.1260191328,
A8: 0.07726908653,
A10: −0.01309093296,
A12: −0.007150760381;
the coefficients for S8 are:
k: −14.48470008,
A4: 0.001993643216,
A6: 0.001732984681,
A8: −0.0007501233534,
A10: 0.00009871280490,
A12: −4.617261030E-06;
and the coefficients for S9 are:
k: −1.799258620,
A4: 0.003597470760,
A6: 0.0000943241385,
A8: −0.000131480899,
A10: −0.00003568433796,
A12: 8.185587866E-06.

When designed with the foregoing coefficients, the miniature zoom lens system of the present invention is configured as a three-lens-group four-lens structure that satisfies the aforesaid conditions (a) to (h) and provides a zoom ratio of approximately 3× while having a reduced overall length as well as enhanced optical quality.

Figure 10A:
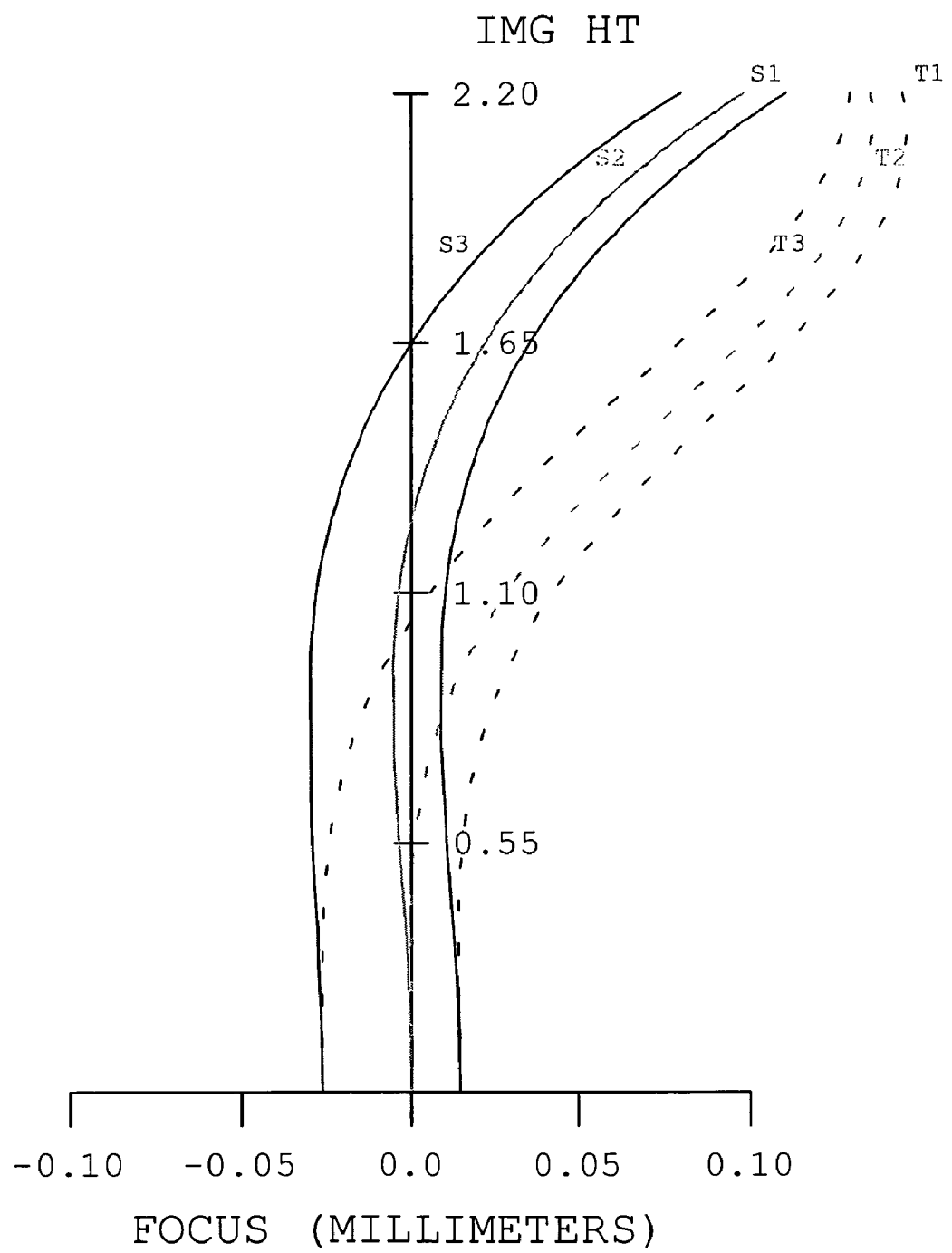
FIGS. 10A, 10B, and 10C respectively show astigmatism curves, distortion curves, and lateral color curves of the miniature zoom lens system according to the second preferred embodiment of the present invention when the miniature zoom lens system is in the wide-angle position illustrated in FIG. 7.
Figure 10B:
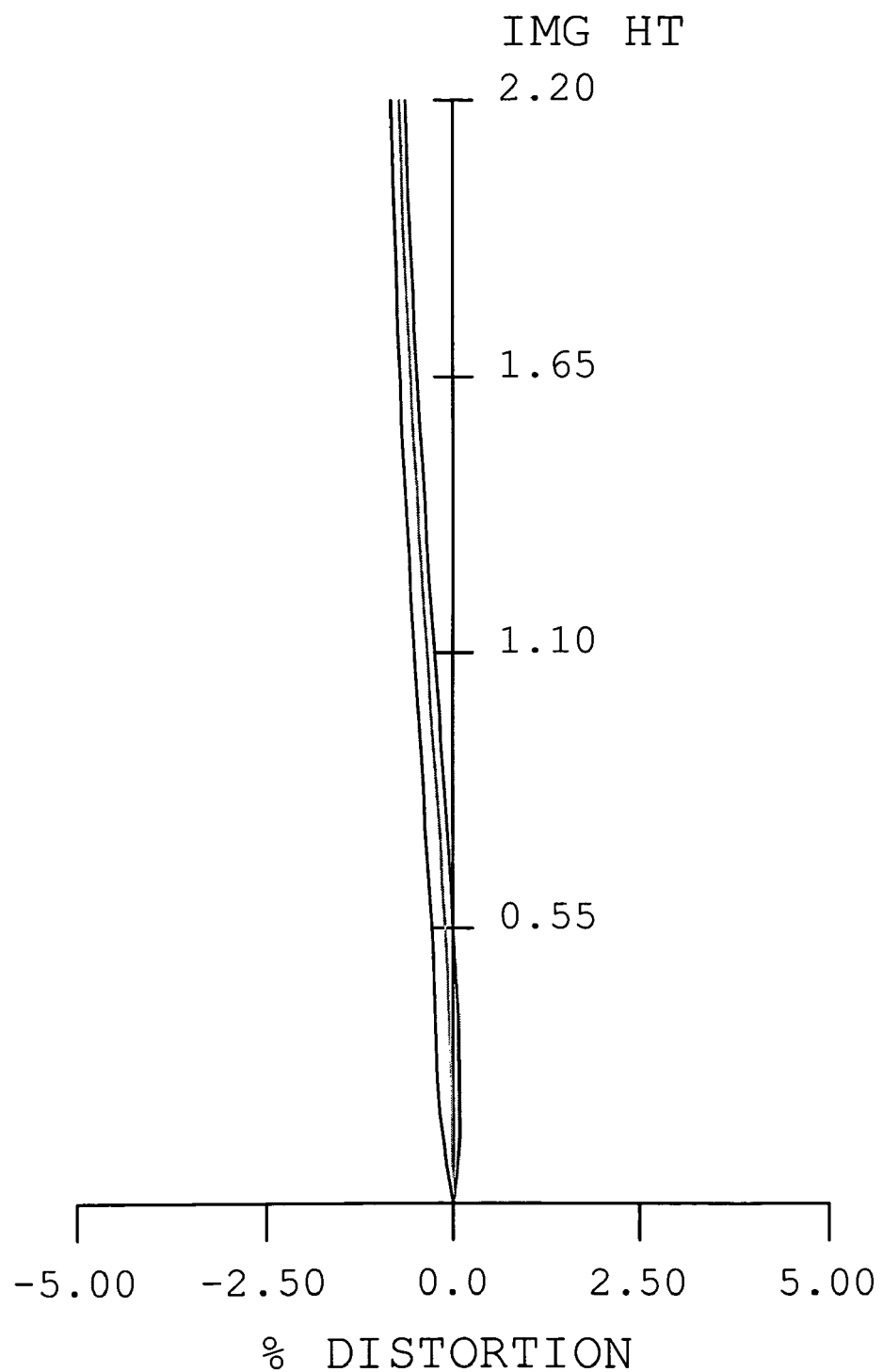
Figure 10C:
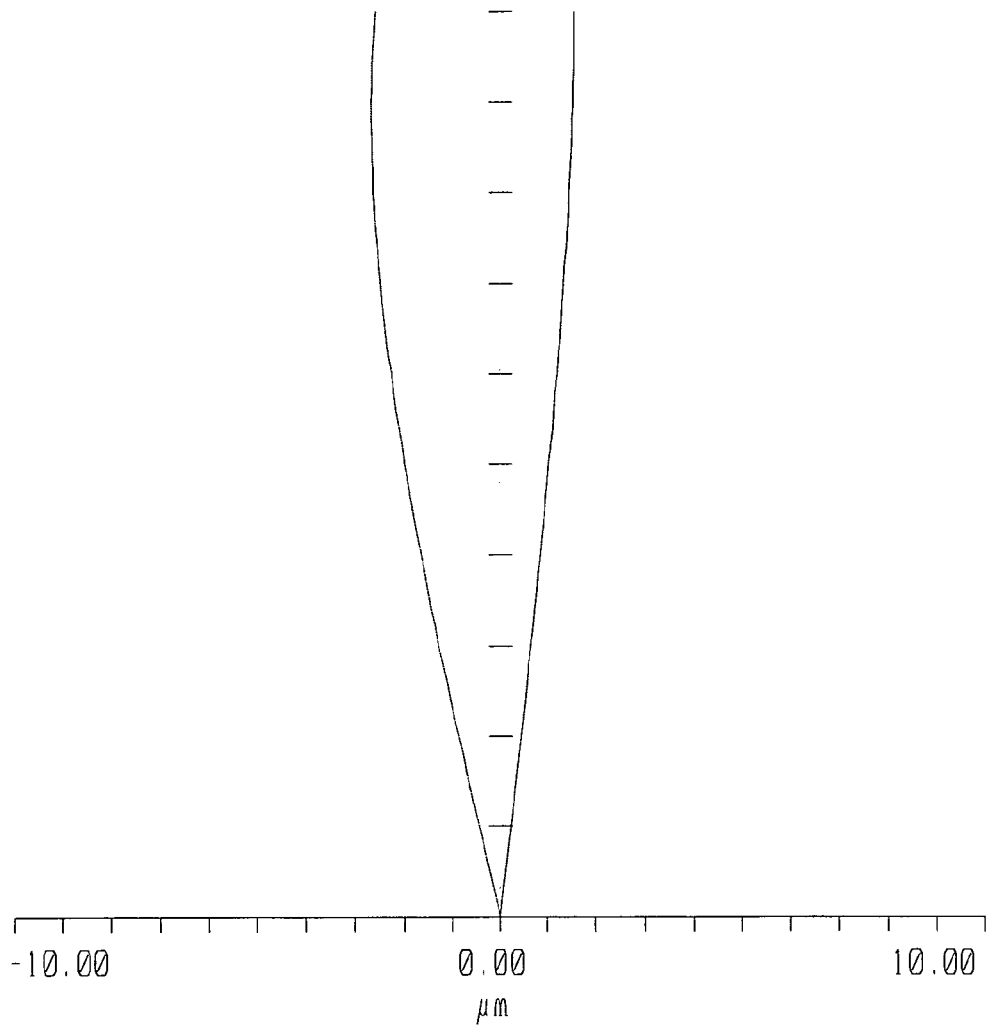
Figure 11A:
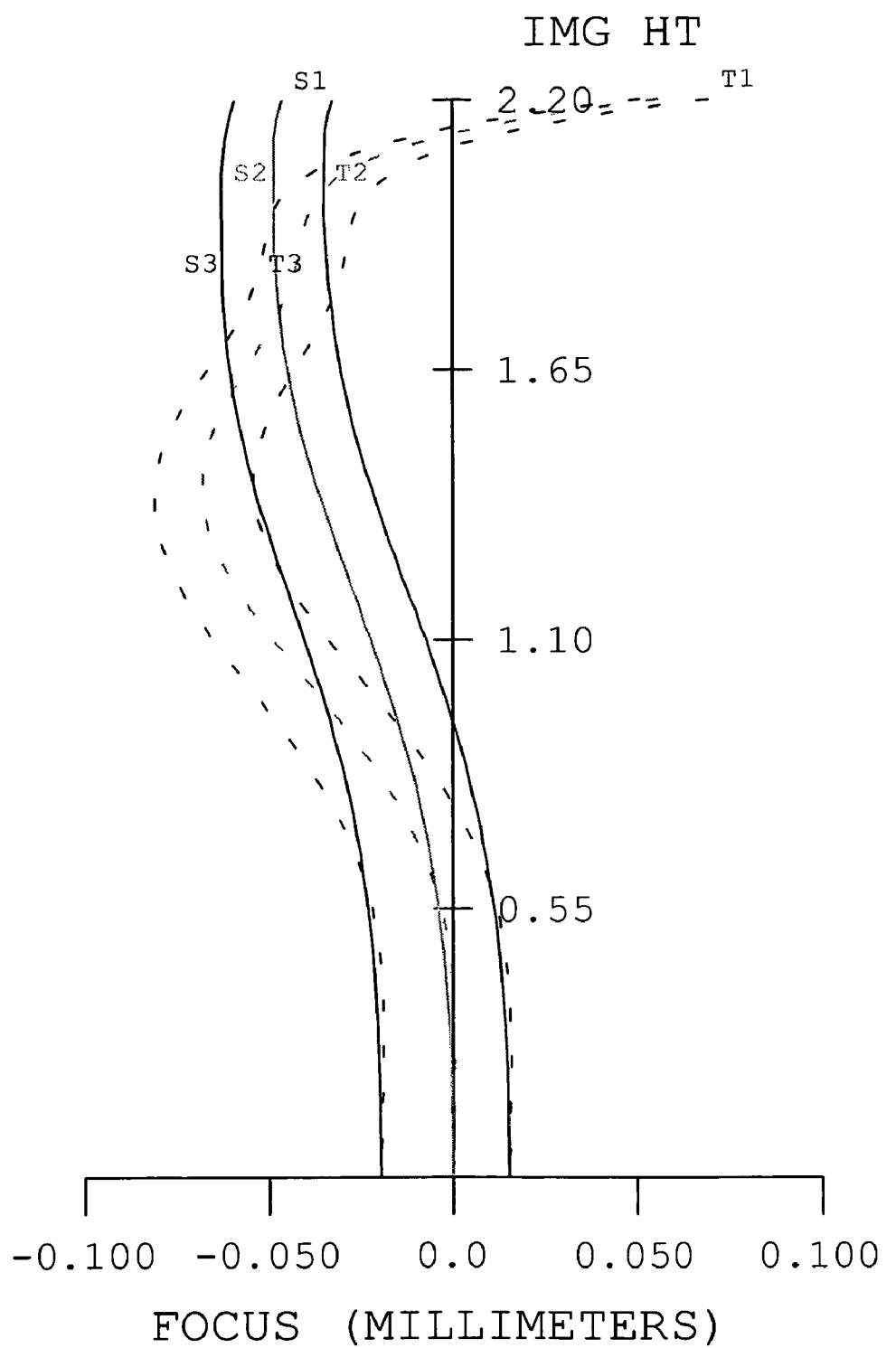
FIGS. 11A, 11B, and 11C respectively show astigmatism curves, distortion curves, and lateral color curves of the miniature zoom lens system according to the second preferred embodiment of the present invention when the miniature zoom lens system is in the middle position illustrated in FIG. 8.
Figure 11B:
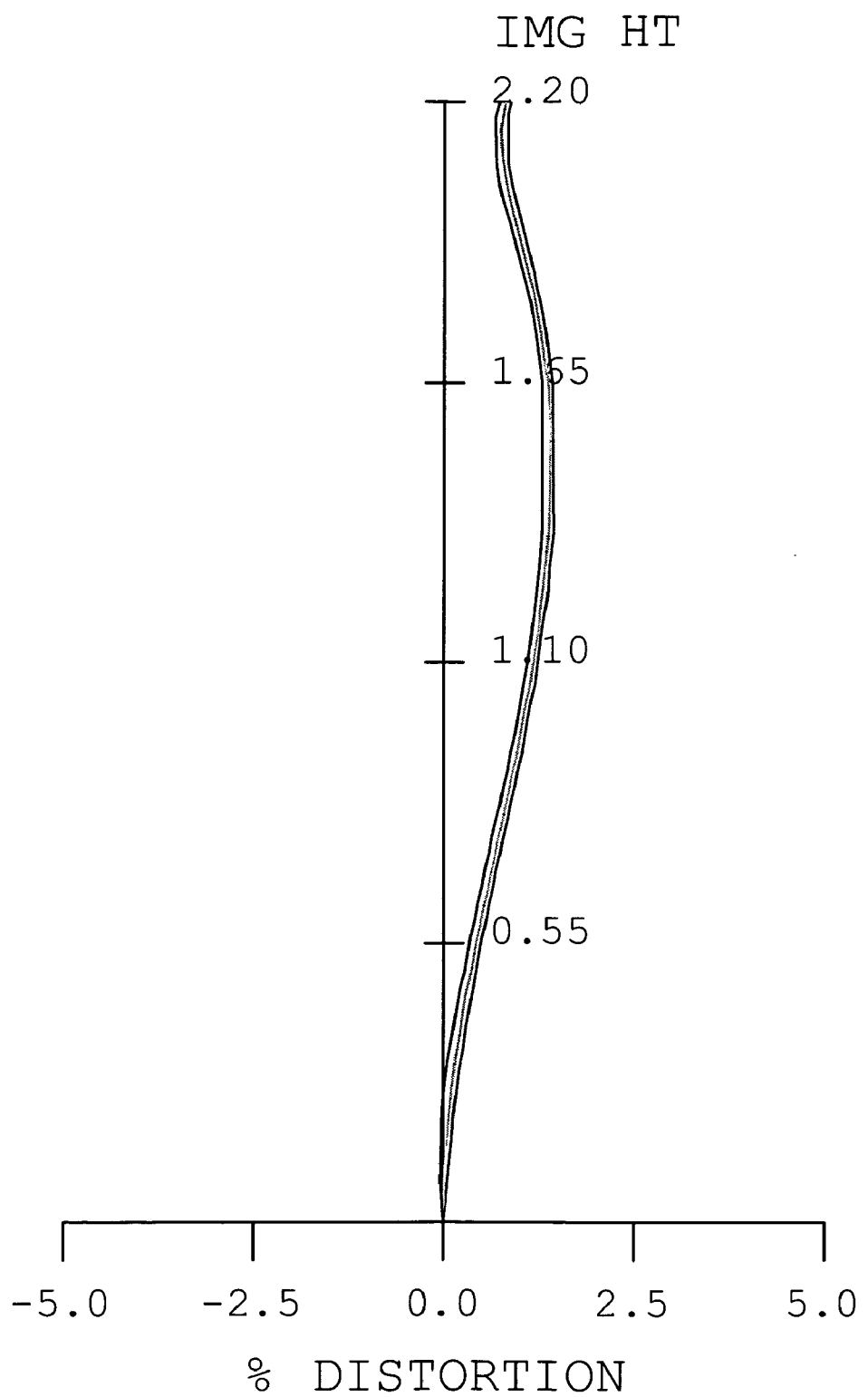
Figure 11C:
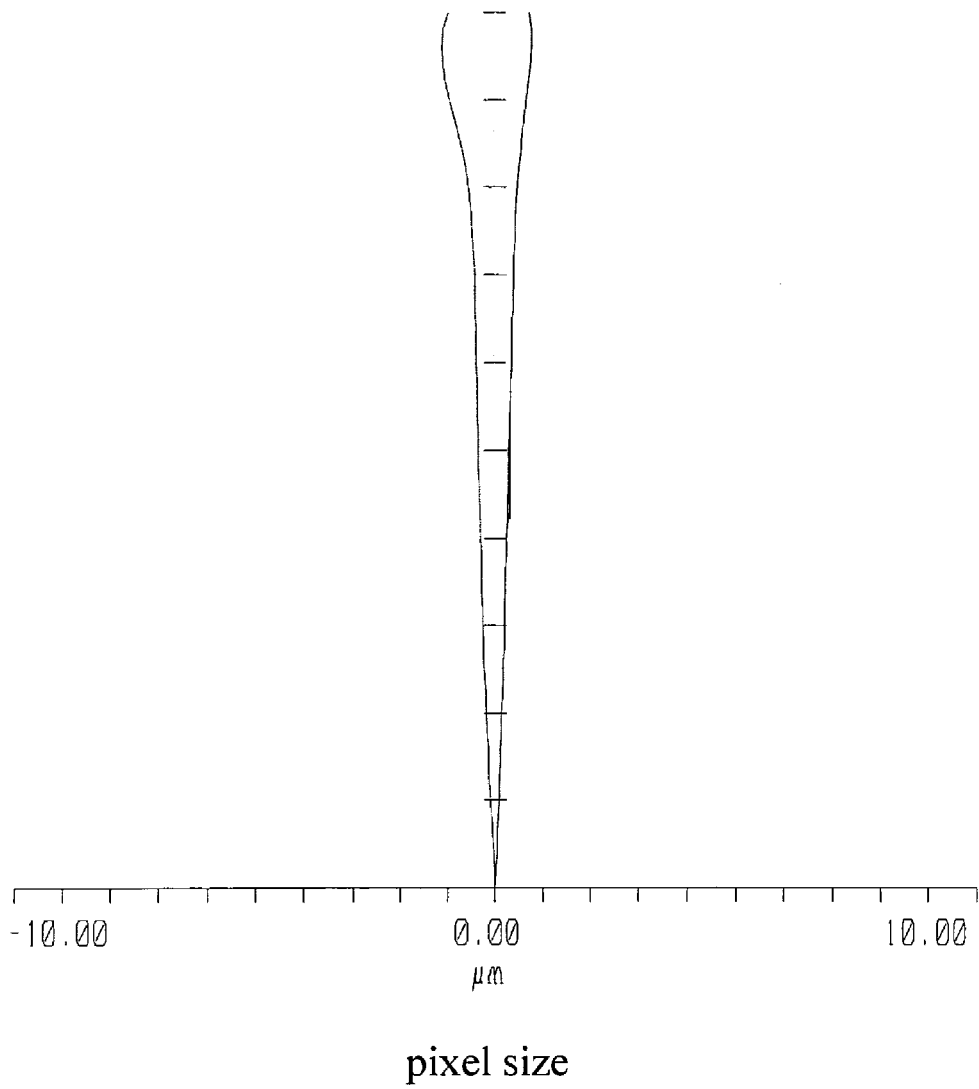
Figure 12A:
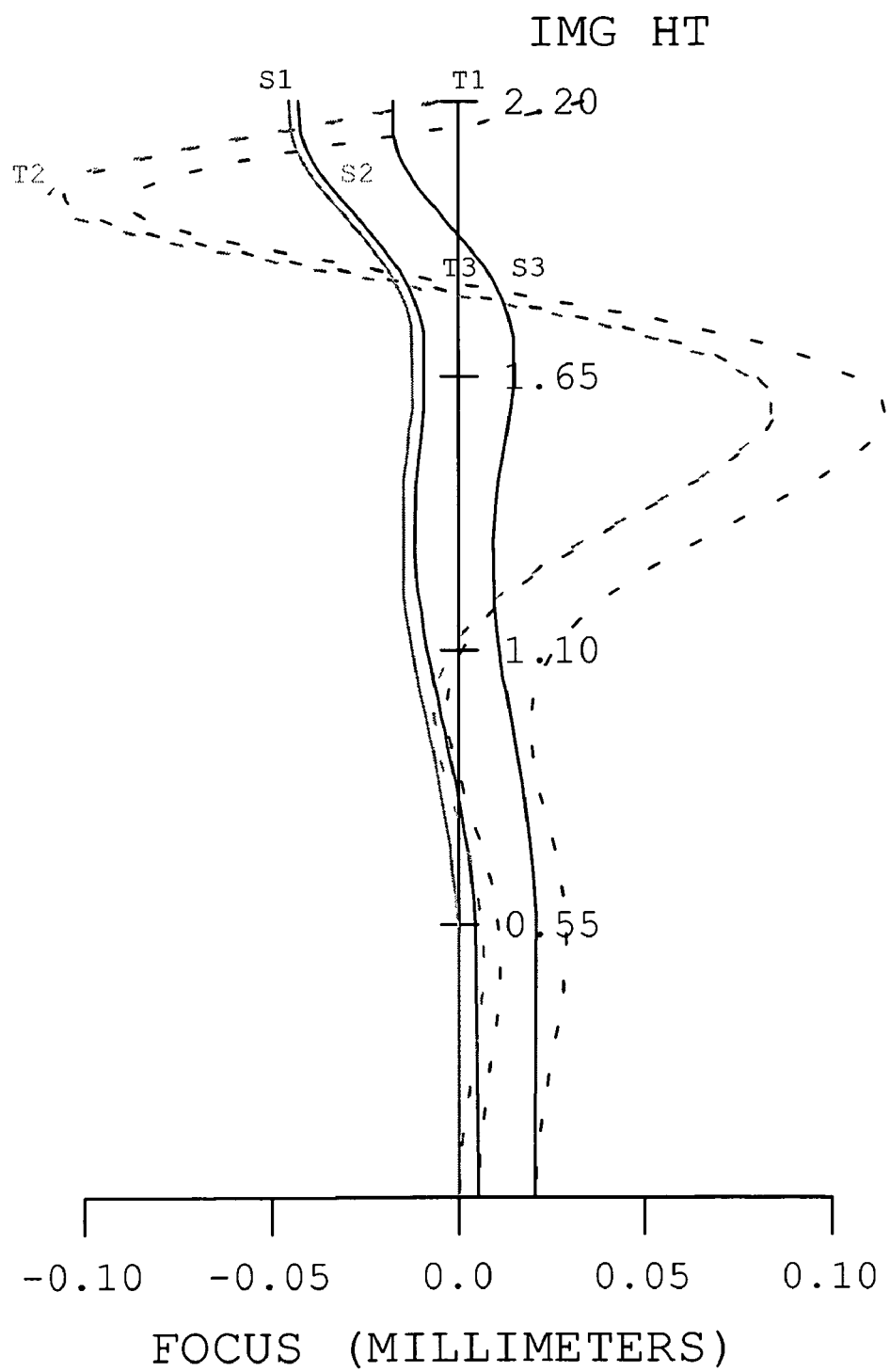
FIGS. 12A, 12B, and 12C respectively show astigmatism curves, distortion curves, and lateral color curves of the miniature zoom lens system according to the second preferred embodiment of the present invention when the miniature zoom lens system is in the telephoto position illustrated in FIG. 9.
Figure 12B:
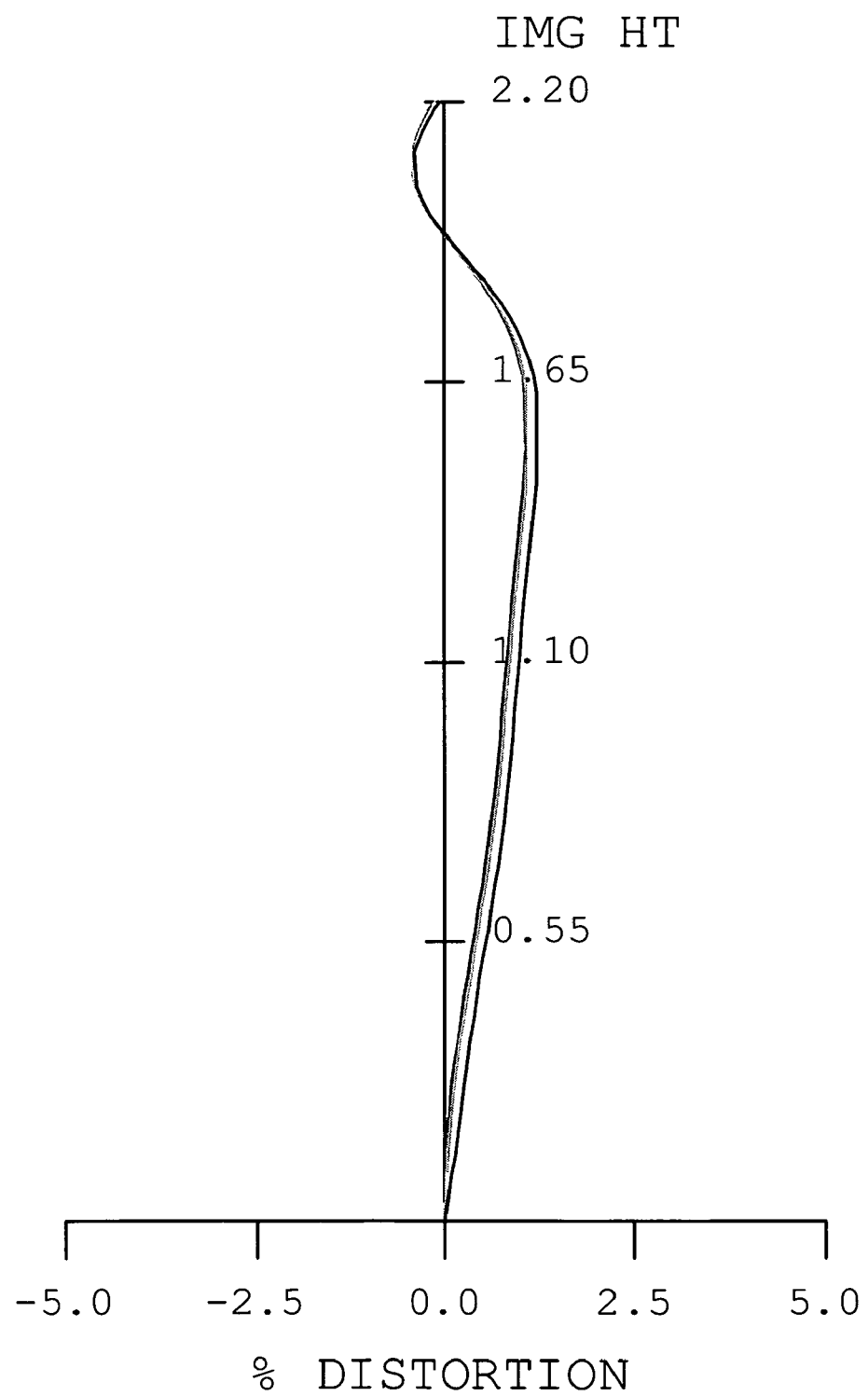
Figure 12C:
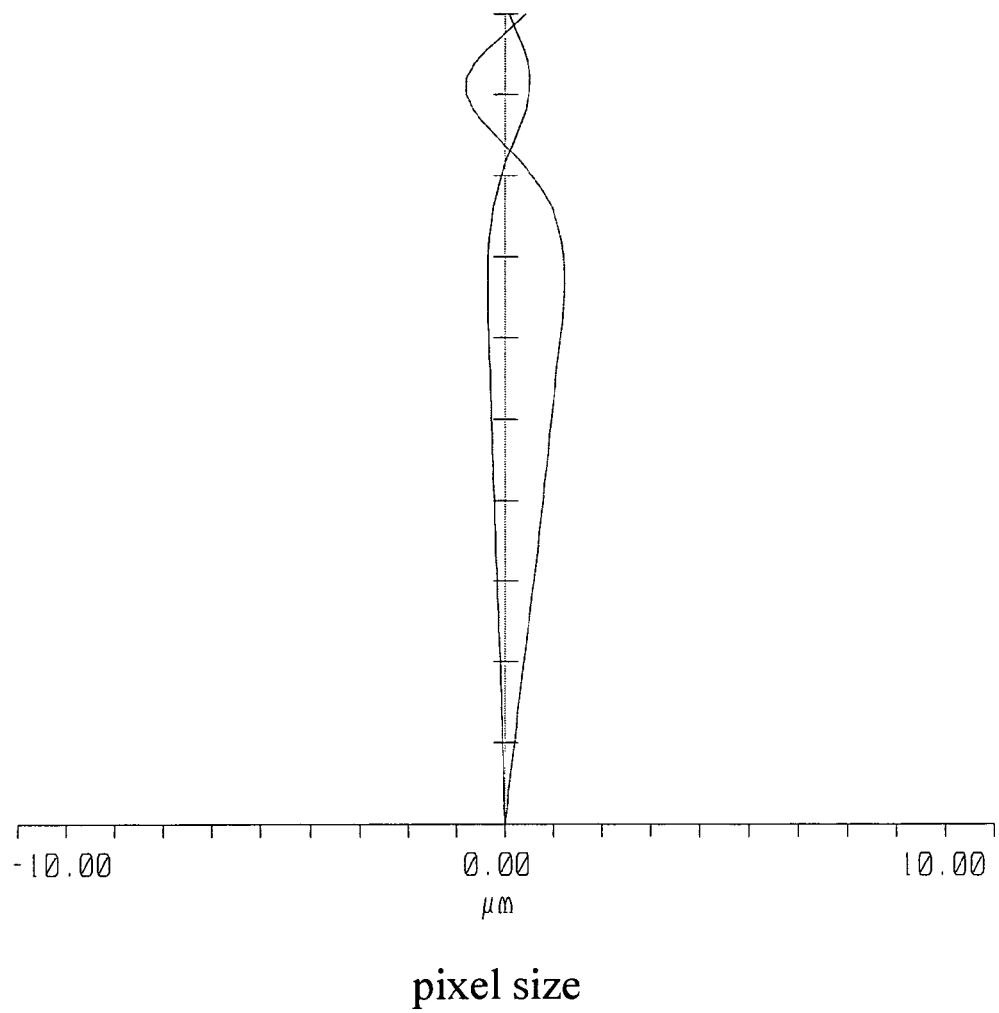

Please refer to FIGS. 10A, 10B, and 10C respectively for astigmatism curves, distortion curves, and lateral color curves of the miniature zoom lens system according to the second preferred embodiment of the present invention when the miniature zoom lens system is in the wide-angle position illustrated in FIG. 7; to FIGS. 11A, 11B, and 11C respectively for astigmatism curves, distortion curves, and lateral color curves of the miniature zoom lens system according to the second preferred embodiment of the present invention when the miniature zoom lens system is in the middle position illustrated in FIG. 8; and to FIGS. 12A, 12B, and 12C respectively for astigmatism curves, distortion curves, and lateral color curves of the miniature zoom lens system according to the second preferred embodiment of the present invention when the miniature zoom lens system is in the telephoto position illustrated in FIG. 9. The curves in the aforementioned drawings prove that the miniature zoom lens system according to the second preferred embodiment of the present invention provides good optical performance and high image quality.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A miniature zoom lens system, comprising, arranged sequentially along an optical axis from an object side to an imaging plane:
a first lens group having a negative refractive power and fixed in position;
a second lens group having a positive refractive power, wherein an aperture stop is provided on a side of the second lens group that faces the first lens group and is movable with the second lens group; and
a third lens group having a positive refractive power;
wherein the second lens group and the third lens group are relatively movable along the optical axis at least between a wide-angle position and a telephoto position, and the miniature zoom lens system satisfies conditions of:

$$11.5 < Dw1\text{-}2/Dw2\text{-}3 < 18.5; \text{ and}$$

$$Dt1\text{-}2/Dt2\text{-}3 < 0.2;$$

where:
Dw1-2 is an air spacing between the first lens group and the second lens group when the second lens group and the third lens group are in the wide-angle position;
Dw2-3 is an air spacing between the second lens group and the third lens group when the second lens group and the third lens group are in the wide-angle position;
Dt1-2 is an air spacing between the first lens group and the second lens group when the second lens group and the third lens group are in the telephoto position; and
Dt2-3 is an air spacing between the second lens group and the third lens group when the second lens group and the third lens group are in the telephoto position.

2. The miniature zoom lens system of claim 1, wherein the first lens group comprises a single first lens, the second lens group comprises a second lens and a third lens, the third lens group comprises a single fourth lens.

3. The miniature zoom lens system of claim 2, wherein the miniature zoom lens system further satisfies condition of:

$$2.8 \leq ft/fw \leq 3.2;$$

where:
fw is the effective focal length of the miniature zoom lens system when the second lens group and the third lens group are in the wide-angle position; and
ft is the effective focal length of the miniature zoom lens system when the second lens group and the third lens group are in the telephoto position.

4. The miniature zoom lens system of claim 2, wherein the miniature zoom lens system further satisfies condition of:

$$1.25 < [(Dw1\text{-}2) - (Dt1\text{-}2)]/fw < 1.95;$$

where:
fw is the effective focal length of the miniature zoom lens system when the second lens group and the third lens group are in the wide-angle position.

5. The miniature zoom lens system of claim 2, wherein the miniature zoom lens system further satisfies conditions of:

$$0.32 < SQRT(fG2 * fG3)/Dw < 0.50;$$

$$1.25 < (fw\_a)/(fg2\_a * fg3\_a) < 2.15;$$

$$0.12 < abs(BFL\_w - BFL\_t)/fw < 0.35; \text{ and}$$

$$6.5 < [(Dw1\text{-}2) - (Dt1\text{-}2)]/[(BFL\_w) - (BFL\_t)] < 10;$$

where:
fw is the effective focal length of the miniature zoom lens system when the second lens group and the third lens group are in the wide-angle position;
fG2 is the effective focal length of the second lens group;
fG3 is the effective focal length of the third lens group;
Dw is a total optical length of the miniature zoom lens system when the second lens group and the third lens group are in the wide-angle position;
SQRT means taking square root;
fg2 is the effective focal length of the second lens;

fg3 is the effective focal length of the third lens;

$fg2\_a = 1/abs(fg2)$;

$fg3\_a = 1/abs(fg3)$;

$fw\_a = 1/abs(fw)$;

BFL_w is the back focal length of the miniature zoom lens system when the second lens group and the third lens group are in the wide-angle position;

BFL_t is the back focal length of the miniature zoom lens system when the second lens group and the third lens group are in the telephoto position; and abs means taking absolute value.

6. The miniature zoom lens system of claim 2, wherein the first lens is a biconcave lens having two surfaces S1 and S2, the aperture stop has a surface S3, the second lens is a biconvex lens having two surfaces S4 and S5, the third lens has two surfaces S6 and S7 and is one of a biconcave lens and a convex-concave lens, and the fourth lens is a biconvex lens having two surfaces S8 and S9, the surfaces S1 and S2 being spherical surfaces, the surfaces S4, S5, S6, S7, S8, and S9 being aspherical surfaces, the second lens being made of glass, the miniature zoom lens system further comprising a filter provided between the fourth lens and the imaging plane.

7. The miniature zoom lens system of claim 6, wherein, when distances and thicknesses are calculated in such a way that measurements toward the right and toward the left of an arbitrary point on the optical axis are assigned positive and negative values, respectively, the miniature zoom lens system satisfies conditions of:

the surface S1 having a radius of curvature of −21.480 mm;
the distance between the surfaces S1 and S1 being 0.799 mm;
the surface S2 having a radius of curvature of 13.280 mm;
the distance between the surfaces S2 and S3 being variable;
the distance between the surfaces S3 and S4 being 0 mm;
the surface S4 having a radius of curvature of 2.089 mm;
the distance between the surfaces S4 and S5 being 1.815 mm;
the surface S5 having a radius of curvature of −4.121 mm;
the distance between the surfaces S5 and S6 being 0.303 mm;
the surface S6 having a radius of curvature of −4.934 mm;
the distance between the surfaces S6 and S7 being 0.769 mm;
the surface S7 having a radius of curvature of 1.977 mm;
the distance between the surfaces S7 and S8 being variable;
the surface S8 having a radius of curvature of 13.479 mm;
the distance between the surfaces S8 and S9 being 1.308 mm;
the surface S9 having a radius of curvature of −7.028 mm;
the distance between the surface S9 and the imaging plane being variable;
the first lens being made of a material whose refractive index is 1.517 and whose Abbe number is 64.167;
the second lens being made of a material whose refractive index is 1.584 and whose Abbe number is 59.200;
the third lens being made of a material whose refractive index is 1.585 and whose Abbe number is 29.909;
the fourth lens being made of a material whose refractive index is 1.531 and whose Abbe number is 56.000.

8. The miniature zoom lens system of claim 7, wherein the curved surfaces S4, S5, S6, S7, S8, and S9 are even aspherical surfaces defined by the following aspherical equation:

$$z = \frac{cr^2}{1 + \sqrt{1 - (1+k)c^2 r^2}} + A_4 r^4 + A_6 r^6 + A_8 r^8 + A_{10} r^{10} + A_{12} r^{12}$$

where c is the curvature at a point along the aspherical surface; r is the distance from that point to the optical axis; k is a conical coefficient; and A4, A6 . . . A12 are $4^{th}$-, $6^{th}$-, . . . , $12^{th}$-order aspherical coefficients, respectively;

wherein, the coefficients for S4 are:
k: 0.041315,
A4: −0.000537186,
A6: 0.00414651,
A8: −0.00911798,
A10: 0.00600987,
A12: −0.00000987644;
the coefficients for S5 are:
k: −1E+40,
A4: −0.023799,
A6: −0.00669498,
A8: 0.00528438,
A10: −0.00116310,
A12: −0.00805505;
the coefficients for S6 are:
k: −1E+40,
A4: −0.11309,
A6: −0.0346800,
A8: 0.0831200,
A10: −0.0873073,
A12: −0.0115358;
the coefficients for S7 are:
k: −5.1730,
A4: −0.0004599,
A6: 0.00405659,
A8: −0.0119315,
A10: 0.0197155,
A12: −0.0143832;
the coefficients for S8 are:
k: −10.85,
A4: 0.00507425,
A6: −0.00161466,
A8: 0.0003443,
A10: −0.00000544202,
A12: −0.0000041062;
and the coefficients for S9 are:
k: 0.59459,
A4: 0.0052912,
A6: −0.00134145,
A8: 0.0000447719,
A10: 0.0000523375,
A12: −0.00000142676.

9. The miniature zoom lens system of claim 6, wherein, when distances and thicknesses are calculated in such a way that measurements toward the right and toward the left of an arbitrary point on the optical axis are assigned positive and negative values, respectively, the miniature zoom lens system satisfies conditions of:

the surface S1 having a radius of curvature of −71.997 mm;
the distance between the surfaces S1 and S2 being 0.4 mm;
the surface S2 having a radius of curvature of 8.047 mm;
the distance between the surfaces S2 and S3 being variable;

the distance between the surfaces S3 and S4 being 0.038 mm;

the surface S4 having a radius of curvature of 2.253 mm;

the distance between the surfaces S4 and S5 being 1.483 mm;

the surface S5 having a radius of curvature of −6.321 mm;

the distance between the surfaces S5 and S6 being 0.315 mm;

the surface S6 having a radius of curvature of 4.038 mm;

the distance between the surfaces S6 and S7 being 0.531 mm;

the surface S7 having a radius of curvature of 1.084 mm;

the distance between the surfaces S7 and S8 being variable;

the surface S8 having a radius of curvature of 7.714 mm;

the distance between the surfaces S8 and S9 being 1.975 mm;

the surface S9 having a radius of curvature of −5.067 mm;

the distance between the surface S9 and the imaging plane being variable;

the first lens being made of a material whose refractive index is 1.497 and whose Abbe number is 81.608;

the second lens being made of a material whose refractive index is 1.584 and whose Abbe number is 59.200;

the third lens being made of a material whose refractive index is 1.585 and whose Abbe number is 29.909; and the fourth lens being made of a material whose refractive index is 1.531 and whose Abbe number is 56.044.

10. The miniature zoom lens system of claim 9, wherein the curved surfaces S4, S5, S6, S7, S8, and S9 are even aspherical surfaces defined by the following aspherical equation:

$$z = \frac{cr^2}{1+\sqrt{1-(1+k)c^2r^2}} + A_4r^4 + A_6r^6 + A_8r^8 + A_{10}r^{10} + A_{12}r^{12}$$

where c is the curvature at a point along the aspherical surface; r is the distance from that point to the optical axis; k is a conical coefficient; and $A_4, A_6 \ldots A_{12}$ are $4^{th}$-, $6^{th}$-, ..., $12^{th}$-order aspherical coefficients, respectively;

wherein, the coefficients for S4 are:
k: 0.0447924953,
A4: 0.000173204142,
A6: 0.00008022267316,
A8: 0.0008263856650,
A10: −0.000822692123,
A12: 0;
the coefficients for S5 are:
k: 0.5344637324,
A4: 0.01265924467,
A6: 0.008019207242,
A8: −0.01121830740,
A10: 0.0006596770887,
A12: 0;
the coefficients for S6 are:
k: −63.70188459,
A4: −0.05138656552,
A6: −0.01251981618,
A8: −0.007893416053,
A10: 0.02028488949,
A12: −0.02705964333;
the coefficients for S7 are:
k: −4.23903491,
A4: 0.1088232336,
A6: −0.1260191328,
A8: 0.07726908653,
A10: −0.01309093296,
A12: −0.007150760381;
the coefficients for S8 are:
k: −14.48470008,
A4: 0.001993643216,
A6: 0.001732984681,
A8: −0.0007501233534,
A10: 0.00009871280490,
A12: −4.617261030E-06;
and the coefficients for S9 are:
k: −1.799258620,
A4: 0.003597470760,
A6: 0.0000943241385,
A8: −0.000131480899,
A10: −0.00003568433796,
A12: 8.185587866E-06.

11. A miniature zoom lens system, comprising, arranged sequentially along an optical axis from an object side to an imaging plane:

a first lens group having a negative refractive power and fixed in position;

a second lens group having a positive refractive power, wherein an aperture stop is provided on a side of the second lens group that faces the first lens group and is movable with the second lens group; and a third lens group having a positive refractive power;

wherein the second lens group and the third lens group are relatively movable along the optical axis at least between a wide-angle position and a telephoto position, and the miniature zoom lens system satisfies conditions of:

$$1.25<[(Dw1\text{-}2)-(Dt1\text{-}2)]/fw<1.95;$$

where:

fw is the effective focal length of the miniature zoom lens system when the second lens group and the third lens group are in the wide-angle position;

Dw1-2 is an air spacing between the first lens group and the second lens group when the second lens group and the third lens group are in the wide-angle position; and Dt1-2 is an air spacing between the first lens group and the second lens group when the second lens group and the third lens group are in the telephoto position.

12. The miniature zoom lens system of claim 11, wherein the first lens group comprises a single first lens, the second lens group comprises a second lens and a third lens, the third lens group comprises a single fourth lens.

13. The miniature zoom lens system of claim 12, wherein the miniature zoom lens system further satisfies condition of:

$$2.8 \leq ft/fw \leq 3.2;$$

where:

ft is the effective focal length of the miniature zoom lens system when the second lens group and the third lens group are in the telephoto position.

14. The miniature zoom lens system of claim 12, wherein the miniature zoom lens system further satisfies conditions of:

$$11.5<Dw1\text{-}2/Dw2\text{-}3<18.5; \text{ and}$$

$$Dt1\text{-}2/Dt2\text{-}3<0.2;$$

where:
Dw2-3 is an air spacing between the second lens group and the third lens group when the second lens group and the third lens group are in the wide-angle position; and
Dt2-3 is an air spacing between the second lens group and the third lens group when the second lens group and the third lens group are in the telephoto position.

15. The miniature zoom lens system of claim 12, wherein the miniature zoom lens system further satisfies conditions of:

$$0.32 < SQRT(fG2*fG3)/Dw < 0.50;$$

$$1.25 < (fw\_a)/(fg2\_a*fg3\_a) < 2.15;$$

$$0.12 < abs(BFL\_w - BFL\_t)/fw < 0.35; \text{ and}$$

$$6.5 < [(Dw1-2)-(Dt1-2)]/[(BFL\_w)-(BFL\_t)] < 10;$$

where:
fG2 is the effective focal length of the second lens group;
fG3 is the effective focal length of the third lens group;
Dw is a total optical length of the miniature zoom lens system when the second lens group and the third lens group are in the wide-angle position;
SQRT means taking square root;
fg2 is the effective focal length of the second lens;
fg3 is the effective focal length of the third lens;

$$fg2\_a = 1/abs(fg2);$$

$$fg3\_a = 1/abs(fg3);$$

$$fw\_a = 1/abs(fw);$$

BFL_w is the back focal length of the miniature zoom lens system when the second lens group and the third lens group are in the wide-angle position;
BFL_t is the back focal length of the miniature zoom lens system when the second lens group and the third lens group are in the telephoto position; and
abs means taking absolute value.

16. The miniature zoom lens system of claim 12, wherein the first lens is a biconcave lens having two surfaces S1 and S2, the aperture stop has a surface S3, the second lens is a biconvex lens having two surfaces S4 and S5, the third lens has two surfaces S6 and S7 and is one of a biconcave lens and a convex-concave lens, and the fourth lens is a biconvex lens having two surfaces S8 and S9, the surfaces S1 and S2 being spherical surfaces, the surfaces S4, S5, S6, S7, S8, and S9 being aspherical surfaces, the second lens being made of glass, the miniature zoom lens system further comprising a filter provided between the fourth lens and the imaging plane.

17. The miniature zoom lens system of claim 16, wherein, when distances and thicknesses are calculated in such a way that measurements toward the right and toward the left of an arbitrary point on the optical axis are assigned positive and negative values, respectively, the miniature zoom lens system satisfies conditions of:
the surface S1 having a radius of curvature of −21.480 mm;
the distance between the surfaces S1 and S1 being 0.799 mm;
the surface S2 having a radius of curvature of 13.280 mm;
the distance between the surfaces S2 and S3 being variable;
the distance between the surfaces S3 and S4 being 0 mm;
the surface S4 having a radius of curvature of 2.089 mm;
the distance between the surfaces S4 and S5 being 1.815 mm;
the surface S5 having a radius of curvature of −4.121 mm;
the distance between the surfaces S5 and S6 being 0.303 mm;
the surface S6 having a radius of curvature of −4.934 mm;
the distance between the surfaces S6 and S7 being 0.769 mm;
the surface S7 having a radius of curvature of 1.977 mm;
the distance between the surfaces S7 and S8 being variable;
the surface S8 having a radius of curvature of 13.479 mm;
the distance between the surfaces S8 and S9 being 1.308 mm;
the surface S9 having a radius of curvature of −7.028 mm;
the distance between the surface S9 and the imaging plane being variable;
the first lens being made of a material whose refractive index is 1.517 and whose Abbe number is 64.167;
the second lens being made of a material whose refractive index is 1.584 and whose Abbe number is 59.200;
the third lens being made of a material whose refractive index is 1.585 and whose Abbe number is 29.909;
the fourth lens being made of a material whose refractive index is 1.531 and whose Abbe number is 56.000.

18. The miniature zoom lens system of claim 17, wherein the curved surfaces S4, S5, S6, S7, S8, and S9 are even aspherical surfaces defined by the following aspherical equation:

$$z = \frac{cr^2}{1 + \sqrt{1-(1+k)c^2r^2}} + A_4r^4 + A_6r^6 + A_8r^8 + A_{10}r^{10} + A_{12}r^{12}$$

where c is the curvature at a point along the aspherical surface; r is the distance from that point to the optical axis; k is a conical coefficient; and A4, A6 ... A12 are $4^{th}$-, $6^{th}$-, ..., $12^{th}$-order aspherical coefficients, respectively;
wherein, the coefficients for S4 are:
k: 0.041315,
A4: −0.000537186,
A6: 0.00414651,
A8: −0.00911798,
A10: 0.00600987,
A12: −0.00000987644;
the coefficients for S5 are:
k: −1E+40,
A4: −0.023799,
A6: −0.00669498,
A8: 0.00528438,
A10: −0.00116310,
A12: −0.00805505;
the coefficients for S6 are:
k: −1E+40,
A4: −0.11309,
A6: −0.0346800,
A8: 0.0831200,
A10: −0.0873073,
A12: −0.0115358;
the coefficients for S7 are:
k: −5.1730,
A4: −0.0004599,
A6: 0.00405659,
A8: −0.0119315,
A10: 0.0197155,
A12: −0.0143832;

the coefficients for S8 are:
k: −10.85,
A4: 0.00507425,
A6: −0.00161466,
A8: 0.0003443,
A10: −0.00000544202,
A12: −0.0000041062;
and the coefficients for S9 are:
k: 0.59459,
A4: 0.0052912,
A6: −0.00134145,
A8: 0.0000447719,
A10: 0.0000523375,
A12: −0.00000142676.

19. The miniature zoom lens system of claim 16, wherein, when distances and thicknesses are calculated in such a way that measurements toward the right and toward the left of an arbitrary point on the optical axis are assigned positive and negative values, respectively, the miniature zoom lens system satisfies conditions of:
the surface S1 having a radius of curvature of −71.997 mm;
the distance between the surfaces S1 and S2 being 0.4 mm;
the surface S2 having a radius of curvature of 8.047 mm;
the distance between the surfaces S2 and S3 being variable;
the distance between the surfaces S3 and S4 being 0.038 mm;
the surface S4 having a radius of curvature of 2.253 mm;
the distance between the surfaces S4 and S5 being 1.483 mm;
the surface S5 having a radius of curvature of −6.321 mm;
the distance between the surfaces S5 and S6 being 0.315 mm;
the surface S6 having a radius of curvature of 4.038 mm;
the distance between the surfaces S6 and S7 being 0.531 mm;
the surface S7 having a radius of curvature of 1.084 mm;
the distance between the surfaces S7 and S8 being variable;
the surface S8 having a radius of curvature of 7.714 mm;
the distance between the surfaces S8 and S9 being 1.975 mm;
the surface S9 having a radius of curvature of −5.067 mm;
the distance between the surface S9 and the imaging plane being variable;
the first lens being made of a material whose refractive index is 1.497 and whose Abbe number is 81.608;
the second lens being made of a material whose refractive index is 1.584 and whose Abbe number is 59.200;
the third lens being made of a material whose refractive index is 1.585 and whose Abbe number is 29.909; and
the fourth lens being made of a material whose refractive index is 1.531 and whose Abbe number is 56.044.

20. The miniature zoom lens system of claim 19, wherein the curved surfaces S4, S5, S6, S7, S8, and S9 are even aspherical surfaces defined by the following aspherical equation:

$$z = \frac{cr^2}{1+\sqrt{1-(1+k)c^2r^2}} + A_4 r^4 + A_6 r^6 + A_8 r^8 + A_{10} r^{10} + A_{12} r^{12}$$

where c is the curvature at a point along the aspherical surface; r is the distance from that point to the optical axis; k is a conical coefficient; and A4, A6 . . . A12 are $4^{th}$-, $6^{th}$-, . . . , $12^{th}$-order aspherical coefficients, respectively;
wherein, the coefficients for S4 are:
k: 0.0447924953,
A4: 0.000173204142,
A6: 0.00008022267316,
A8: 0.0008263856650,
A10: −0.000822692123,
A12: 0;
the coefficients for S5 are:
k: 0.5344637324,
A4: 0.01265924467,
A6: 0.008019207242,
A8: −0.01121830740,
A10: 0.0006596770887,
A12: 0;
the coefficients for S6 are:
k: −63.70188459,
A4: −0.05138656552,
A6: −0.01251981618,
A8: −0.007893416053,
A10: 0.02028488949,
A12: −0.02705964333;
the coefficients for S7 are:
k: −4.23903491,
A4: 0.1088232336,
A6: −0.1260191328,
A8: 0.07726908653,
A10: −0.01309093296,
A12: −0.007150760381;
the coefficients for S8 are:
k: −14.48470008,
A4: 0.001993643216,
A6: 0.001732984681,
A8: −0.0007501233534,
A10: 0.00009871280490,
A12: −4.617261030E-06;
and the coefficients for S9 are:
k: −1.799258620,
A4: 0.003597470760,
A6: 0.0000943241385,
A8: −0.000131480899,
A10: −0.00003568433796,
A12: 8.185587866E-06.

* * * * *